United States Patent [19]
Gudat et al.

[11] Patent Number: 5,471,391
[45] Date of Patent: Nov. 28, 1995

[54] METHOD AND APPARATUS FOR OPERATING COMPACTING MACHINERY RELATIVE TO A WORK SITE

[75] Inventors: Adam J. Gudat, Edelstein; Daniel L. Henderson, Washington, both of Ill.

[73] Assignee: Caterpillar Inc., Peoria, Ill.

[21] Appl. No.: 164,171

[22] Filed: Dec. 8, 1993

[51] Int. Cl.$^6$ .............................................. G06F 165/00
[52] U.S. Cl. ................... 364/424.07; 364/449; 364/460; 364/151; 340/995
[58] Field of Search .................. 364/449, 460, 364/424.07, 424.01, 424.02, 148, 149, 150, 151, 146, 551.01, 551.02, 562, 578; 342/357, 457; 340/989, 990, 995; 37/906, 907

[56] References Cited

U.S. PATENT DOCUMENTS

| | | | |
|---|---|---|---|
| 4,380,050 | 4/1983 | Tanner | 364/461 |
| 4,677,555 | 6/1987 | Goyet | 364/424 |
| 4,807,131 | 2/1989 | Clegg | 364/424.01 |
| 4,814,711 | 3/1989 | Olsen et al. | 342/331 |
| 4,820,041 | 4/1989 | Davidson et al. | 356/1 |
| 4,831,539 | 5/1989 | Hagenbuch | 364/449 |
| 4,915,757 | 4/1990 | Rando | 156/64 |
| 4,965,586 | 10/1990 | O'Neill | 342/357 |
| 5,100,229 | 3/1992 | Lundberg et al. | 356/1 |
| 5,144,317 | 9/1992 | Duddek et al. | 342/357 |
| 5,148,110 | 9/1992 | Helms | 324/323 |
| 5,265,025 | 11/1993 | Hirata | 364/449 |
| 5,287,280 | 2/1994 | Yamamoto et al. | 364/426.03 |
| 5,334,987 | 8/1994 | Teach | 342/357 |
| 5,359,521 | 10/1994 | Kyrtsos et al. | 364/449 |
| 5,375,663 | 12/1994 | Teach | 172/4.5 |

FOREIGN PATENT DOCUMENTS

| | | |
|---|---|---|
| 0139292 | 10/1984 | European Pat. Off. . |
| 0297811 | 6/1988 | European Pat. Off. . |
| 4133392 | 10/1991 | Germany . |
| 59-021835 | 3/1984 | Japan . |
| 64174247 | 7/1989 | Japan . |

OTHER PUBLICATIONS

"Super Distance Unmanned Heavy Equipment System", Aug. 1993.
GPS World Newsletter, Oct. 28, 1993.
Design News, Oct. 18, 1993 "Waging War on Radioactive Refuse" pp. 78–84.
ILS Today, May 17, 1993.
Design News, Aug. 2, 1993 pp. 27–28.
Real–time Locating for Remote Sensing, Jul. 1993, p. 26.
Image Systems Technology, Inc., Rasterware Specifications, May 1993.
Information Technology, Oct. 18, 1993 p. 96.
Caterpillar World, May 1993 pp. 1–7.

(List continued on next page.)

*Primary Examiner*—Michael Zanelli
*Attorney, Agent, or Firm*—Young, MacFarlane & Wood

[57] ABSTRACT

A method and apparatus for operating compacting machinery such as landfill, earth or asphalt compactors relative to a work site to compact the site material toward a desired degree of compaction. A first model representing the desired degree of compaction of the site and a second model representing the actual degree of compaction of the site are stored in a digital data storage facility. The machine is equipped with a position receiver to determine in three-dimensional space the location of the compacting portions of the machine relative to the site. A dynamic database receives the machine position information, determines the difference between the degree of compaction of the first and second site models and generates representational signals of that difference for directing the operation of the machine to bring the actual degree of compaction of the site into conformity with the desired degree of compaction. In one embodiment, the signals representing the machine position and the difference between the first and second site models are used to generate an operator display which is updated in real time as the machine operates over the site. Alternately, the signals representing the difference between the first and second site models can be supplied to automatic machine controls for automatic or semi-automatic operation of the machine.

86 Claims, 17 Drawing Sheets

OTHER PUBLICATIONS

Article, Sumpter & Asher–GPS Goes Real Time Sep. 7, 1994 pp. 64, 65, 66.

Article, Graber–GPS Applications In Insurance Mines Aug. 13, 1994 pp. 6–11.

Spectra–Physics Laserplane, Jan. 1992 (4 pages) brochure.

Agtek, Sep. 15, 1993 (2 pages) brochure.

International Search Report for PCT US 94/12733, Apr. 11, 1994 (7 pages).

Philip Greenspun; Site Controller: A System For Computer–Aided Civil Engineering And Construction; Technical Report1408 MIT; May 1993; p. 33.

METHOD AND APPARATUS FOR OPERATING COMPACTING MACHINERY RELATIVE TO A WORK SITE

FIELD OF THE INVENTION

This invention relates to the operation of machinery for compacting the surface of a work site and, more particularly, to the real time generation and use of digital data which collectively represents the degree of compaction of the work site as it is being altered by the machinery toward a desired state.

As used in this patent specification the phrase "compacting machinery" and various approximations thereof refer to self-propelled mobile machines such as wheel-type landfill, earth and asphalt compactors which exhibit both (1) mobility over a work site as a result of being provided with a prime mover (for example an engine) on a frame which drives wheels supporting the frame, and (2) the capacity to compact the work site as a consequence of the provision on the frame of one or more wheels or rollers which serve as both carriage support and the compacting tool.

BACKGROUND OF THE INVENTION

Despite the development of sophisticated and powerful compacting machinery it remains a time consuming and labor intensive chore to adequately compact material such as trash, earth, or asphalt at work sites such as landfills, construction sites, roads and the like. The material to be compacted, for example trash or waste in a landfill, is typically spread over the site in an uncompacted state and must be repeatedly traversed by a compactor until it is compressed to a predetermined desired degree of compaction. A common type of compacting machinery includes one or more heavy compacting wheels or rollers which compact the material in their path. Success in achieving the desired degree of compaction of the material on the site is measured, for example, by the number of passes a compacting wheel makes over a given area or by the elevational change from the uncompacted level.

Until now compacting operations have largely been monitored and controlled by the machinery operators and supervisors on an intuitive basis, and with the use of static site surveys and physical markers to measure and monitor the compacting operation and the overall topography of the site. For example, after empirically determining the number of passes needed to compact the site material to a desired degree of compaction, the operator drives the compacting machinery back and forth over the site, gauging by memory, feel, visual observation and perhaps comparison to colored stakes or similar physical cues when the desired degree of compaction has been reached. This process is complicated by the frequent addition of new, uncompacted material to the site. Each time new material is placed on the site, the previous compaction work on that area is effectively erased and the operator must start over in compacting that area. Where the site has not been uniformly compacted prior to the addition of new material, or where the material is added to only a portion of the site while the operator is in the middle of a compacting operation, the likelihood that the compacting operation can be monitored and completed uniformly and efficiently is significantly reduced.

For more certain knowledge of the degree to which the uncompacted material and the site in general have been brought into conformity with the desired degree of compaction and desired site topography, a supervisor or survey crew from time to time verifies the amount of compaction and site build-up and manually updates any staking or marking of the site and the site model. Between these occasional verifications the compacting machinery operators and supervisors have no truly accurate way to monitor and measure their real time progress.

Accordingly, even the most skillful and experienced operators can achieve only limited efficiency in compacting a large land site, such difficulty being due in part to the absence of large scale as well as detailed information as to the real-time progress being made in the compaction of the site.

SUMMARY DISCLOSURE OF THE INVENTION

The invention provides a solution to the long standing problems of operating compacting machinery to accurately and efficiently compact material on a work site toward a desired degree of compaction. The subject invention achieves such compacting operations without the need for physical markers on the site to cue the operator, with only such interruptions in operation as are needed, for example, to refuel the machinery, and with a minimum need for crew.

In general this is accomplished through the provision of a digital data storage, retrieval and process facility which per se may be carried on the compacting machinery or located remotely from the compacting machinery but connected, for example, by radio link to the compacting machinery for storing, actually creating, and modifying a digital model of the site as it exists at any given time, as well as a digital model of the desired degree of compaction of the site.

The subject invention further comprises a mechanism by which the exact position in three-dimensional space of the compacting machine, or its operative compacting wheels or rollers, can be accurately determined in real time; i.e., as it moves over and compacts the site thereby to update the digital model, point by point and in real time as the machinery traverses it. As hereinafter described the preferred implementation of the invention involves the use of a phase differential GPS (global positioning system) receiver system which is capable of precisely locating an object in three-dimensional space to centimeter accuracy.

The subject invention further comprises means for comparing the desired site model to the continuously updated actual site model and for generating signals representing the degree of compaction needed at each of a large number of coordinates over the site to bring the actual model into conformity with the desired model. These signals may in one instance provide real time displays on or off the compacting machinery to cue the operator as to the machine's actual progress in real time and within a frame of reference which conveys information as to at least a substantial portion of the overall site. In another embodiment hereinafter described the signals representing the differences between the desired and actual site models are applied to the real time automatic controls of the machine itself or a portion thereof or both.

In a preferred form at least a portion of the position-determining mechanism or system is carried on the compacting machine itself as it traverses the site.

According to another aspect of the invention a method is provided for directing the operations of a mobile compacting machine which comprises the steps of producing and storing in a digital data storage and retrieval means a first site model representing the desired degree of compaction of the site and a second site model representing the actual degree of compaction of the site, thereafter generating digital signals representing in real time the instantaneous position in three-dimensional space of the compacting machine as it traverses and compacts the site, utilizing the digital signals to update the second model, determining the difference between the first model and the updated second model and directing the operations of the machine in accordance with the difference to bring the updated second model into conformity with the first model.

In one embodiment the step of directing the operation of the compacting machine is carried out by providing to a machine operator a display which informs the operator in real time of the instantaneous position of the compacting machine relative to the work site, the alterations which are needed to bring the actual degree of compaction of the site into conformity with the first model, and the actual progress being made toward the realization of the first model.

In another embodiment the step of directing the operations of the compacting machine is carried out in an automatic or semi-automatic fashion by working through electrohydraulic actuators to control the position and direction of movement of the machine.

In a preferred form at least a portion of the position-determining means is carried on the compacting machine itself as it traverses the site.

As hereinafter made more explicit, both the apparatus and the method aspects of the present invention can be achieved in various ways; for example, the digital data storage and retrieval facility as well as the updating and differencing means may be carried by and on the compacting machine as part of an integral and comprehensive on-board machine system. Alternately these means may be located at an off site or nearby facility for transmitting visual display signals or automatic control signals to the compacting machine and for receiving updated position and site information from the machine during operation thereof.

As hereinafter described in detail the compacting machine may be a wheeled or roller-type compactor such as used, for example, to compact landfills, earth or asphalt.

In the preferred form the method and apparatus aspects of the invention are realized through the utilization of three-dimensional position information derived from global positioning satellites using a phase differential GPS receiver system. Such GPS receivers utilize signals from global positioning satellites as well as a differential signal from a local reference receiver of known position coordinates to generate position coordinate data to centimeter accuracy. Accordingly, the apparatus used to carry out the invention in the preferred form comprises a GPS receiver having both GPS and local signal reception capabilities and, where a local reference signal at a geodetically surveyed site is not available, a temporary surveyed differential receiver/transmitter to provide the local data processing apparatus with a correction signal. Alternately, raw position data can be transmitted from the reference receiver to the local data processor for comparison and correction with the information from the machine-mounted receiver.

According to another aspect of the invention means are provided for precisely generating and controlling displays which are suitable for use in performing compacting operations on sites such as landfills, construction sites, and roads so as to precisely display the progress being made by the compacting machine on an incremental basis where the unit areas of the display may or may not correspond to the sampling rate of the GPS receiver and digital processor system. As hereinafter described, the site, or a practically displayable portion thereof, is subdivided into a continuous matrix of unit areas of such size that the compacting machine may traverse these unit areas at a rate which is greater than the sampling rate of the GPS receiver and data processing facility. Algorithms are provided which take into account the physical parameters and dimensions of the compacting wheels or rollers and the relationship thereof to the machine and its path of travel. The unit areas of the display are filled in, colored, revised or otherwise altered in accordance with progress information derived from the GPS receiver or other positioning system and the digital processing facility, in accordance with the hereinafter described laws of the algorithm which is in residence in the digital processing facility.

In one embodiment of the invention the real-time path of the compacting machine relative to the site between position readings is determined with a differencing algorithm which determines an effective width of a compacting wheel less than or equal to its actual width, and updates each portion of the site model which the effective width traverses. In a preferred form, the instantaneous position of the machine as it traverses the site is tracked as a series of coordinate points on the site model. Where the rate at which the coordinate points are tracked is not synchronous with the rate of travel of the compacting machine over the unit areas or grid elements of the site, the differencing algorithm determines the unit areas traversed by the compacting wheel of the machine between coordinate points. The effective parameters of the compacting wheel are preferably set less than its actual parameters to ensure that only those portions of the site actually traversed to some degree by the wheel are filled in, colored, revised or otherwise altered or marked to reflect a compacting pass and the current difference in degree of compaction between the actual and desired site models.

In one embodiment or utilization of the invention the first site model is a predetermined compaction standard for the site topography, representing the compacting operations needed to bring the uncompacted topography or surface material to a desired degree of compaction. One preferred method is the use of a pass count standard; i.e., the number of compacting passes predetermined to bring the uncompacted material to the desired degree of compaction. Alternately, the compacting standard may comprise a change in the elevation of the site surface predetermined to indicate a desired degree of compaction from an uncompacted level. The system and method of the invention can also monitor and update the overall topography of the site as it is built up or filled in by repeated additions of new material and the compacting operations.

In one embodiment or utilization of the invention the second or actual site model may be initially created using standard state-of-the-art site surveying methods to record the actual elevation or topography of the site surface, and thereafter the data from such survey digitized in accordance with the physical and data processing requirements of the particular digitizing and data processing system used. Alternatively, the actual site model may be created by traversing the site with the compacting machine itself or through the use of special machinery and/or vehicles which are suited to the conditions.

BRIEF DESCRIPTION OF THE DRAWINGS

FIGS. 7A–7I are flowchart representations of a dynamic site database according to the present invention;

DETAILED DESCRIPTION OF THE ILLUSTRATED EMBODIMENTS

Figure 1:
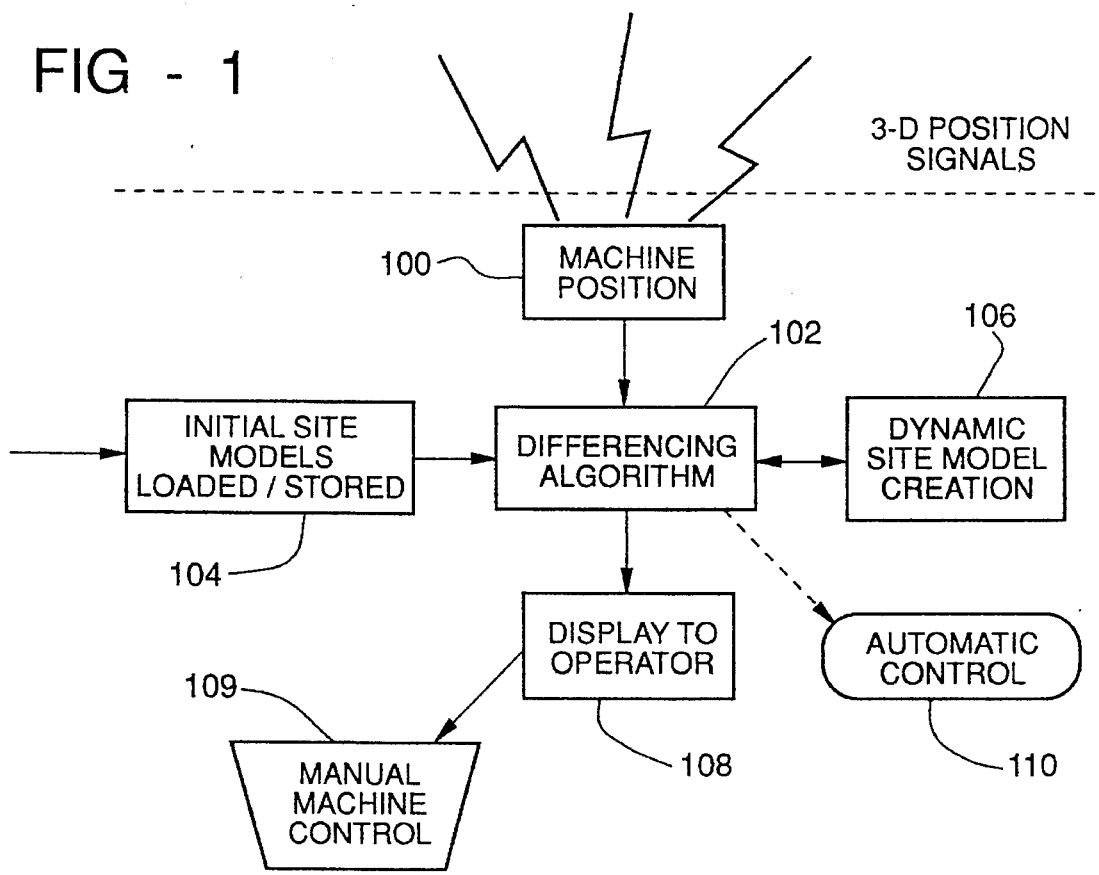
FIG. 1 is a schematic representation of a compacting machinery position and control method according to the present invention.

Referring to FIG. 1, the method of the present invention for use in a compacting operation is shown schematically. Using a known three-dimensional positioning system with an external reference, for example (but not limited to) 3-D laser, GPS, GPS/laser combinations or radar, compacting machine position coordinates are determined in block 100 as the machine moves over the site. These coordinates are instantaneously supplied as a series of discrete points to a differencing algorithm at 102. The differencing algorithm calculates the machine position and path in real time. Digitized models of the actual and desired degree of compaction of the site topography are loaded or stored at block 104, an accessible digital storage and retrieval facility, for example a local digital computer. The differencing algorithm 102 retrieves, manipulates and updates the site models from 104 and generates at 106 a dynamic site database of the difference between the actual site and the desired site model, updating the actual site model in real-time as new position information is received from block 100. This dynamically updated site model is then made available to the operator in display step 108, providing real time position, direction and site topography/compaction updates in human readable form. Using the information from the display the operator can efficiently monitor and direct the manual control of the compacting machine at 109.

Additionally, or alternately, the dynamic update information can be provided to an automatic machine control system at 110, for example an electrohydraulic control system of the type developed by Caterpillar Inc. and used to operate the various pumps, valves, hydraulic cylinders, motor/steering mechanisms and other controls used in compacting machinery. The electrohydraulic controls can provide an operator assist to minimize machine work and limit the manual controls if the operator's proposed action would, for example, overload the machine. Alternately, the site update information from the dynamic database can be used to provide fully automatic control of one or more machine operating systems.

It will be clear from the foregoing that with the present method a model of the initial, actual site topography can be generated by the compacting machine itself on previously unsurveyed terrain. By simply moving the machine over a proposed site in a regular pattern, the current topography can be determined. Once the initial topography of the site is established as an initial three-dimensional reference, actual and desired site models can be loaded at 104. The desired site model is a predetermined desired degree of compaction of material on the site surface. The actual site model is the actual degree of compaction of the site material, ranging between an uncompacted state and the desired degree of compaction. When the machine traverses the site in a compacting operation, the actual site model is monitored and updated in real time at 106 as the machine brings the actual site into conformity with the desired site model.

Figure 2:
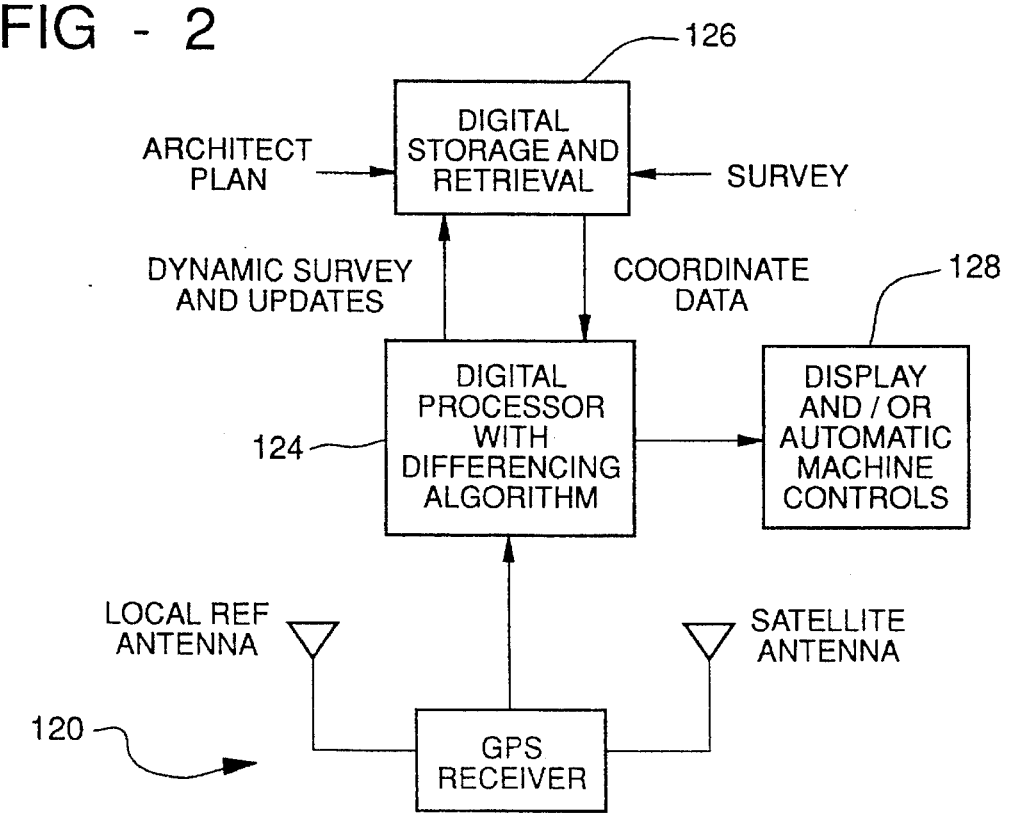
FIG. 2 is a schematic representation of an apparatus which can be used in connection with the receipt and processing of GPS signals to carry out the present invention.

Referring now to FIG. 2, an apparatus which can be used in connection with the receipt and processing of GPS signals to carry out the present compacting invention is shown in block diagram form comprising a GPS receiver apparatus 120 with a local reference antenna and a satellite antenna; a digital processor 124 employing a differencing algorithm, and connected to receive position signals from 120; a digital storage and retrieval facility 126 accessed and updated by processor 124, and an operator display and/or automatic machine controls at 128 receiving signals from processor 124.

GPS receiver system 120 includes a satellite antenna receiving signals from global positioning satellites, and a local reference antenna. The GPS receiver system 120 uses position signals from the satellite antenna and differential correction signals from the local reference antenna to generate position coordinate data in three-dimensions to centimeter accuracy for moving objects. Alternatively, raw data from the reference antenna can be transmitted to processor 124, where the differential correction can be locally determined.

This position information is supplied to digital processor 124 on a real-time basis as the coordinate sampling rate of the GPS receiver 120 permits. The digital storage facility 126 stores a first site model of the desired degree of compaction of the site, for example according to a predetermined compaction standard, and a second site model of the actual degree of compaction of the site, for example uncompacted as initially surveyed. The actual site model can be accessed and updated in real time by digital processor 124 as it receives new position information from GPS receiver 120.

Digital processor 124 further generates signals representing the difference between the continuously-updated actual site model and the desired site model. These signals are provided to the operator display and/or automatic machine controls at 128 to direct the operation of the machine over the site to bring the updated actual site model into conformity with the desired site model. The operator display at 128, for example, provides one or more visual representations of the difference between the actual site model and the desired site model to guide the operator in running the machine for the necessary compacting operations.

Figure 3:
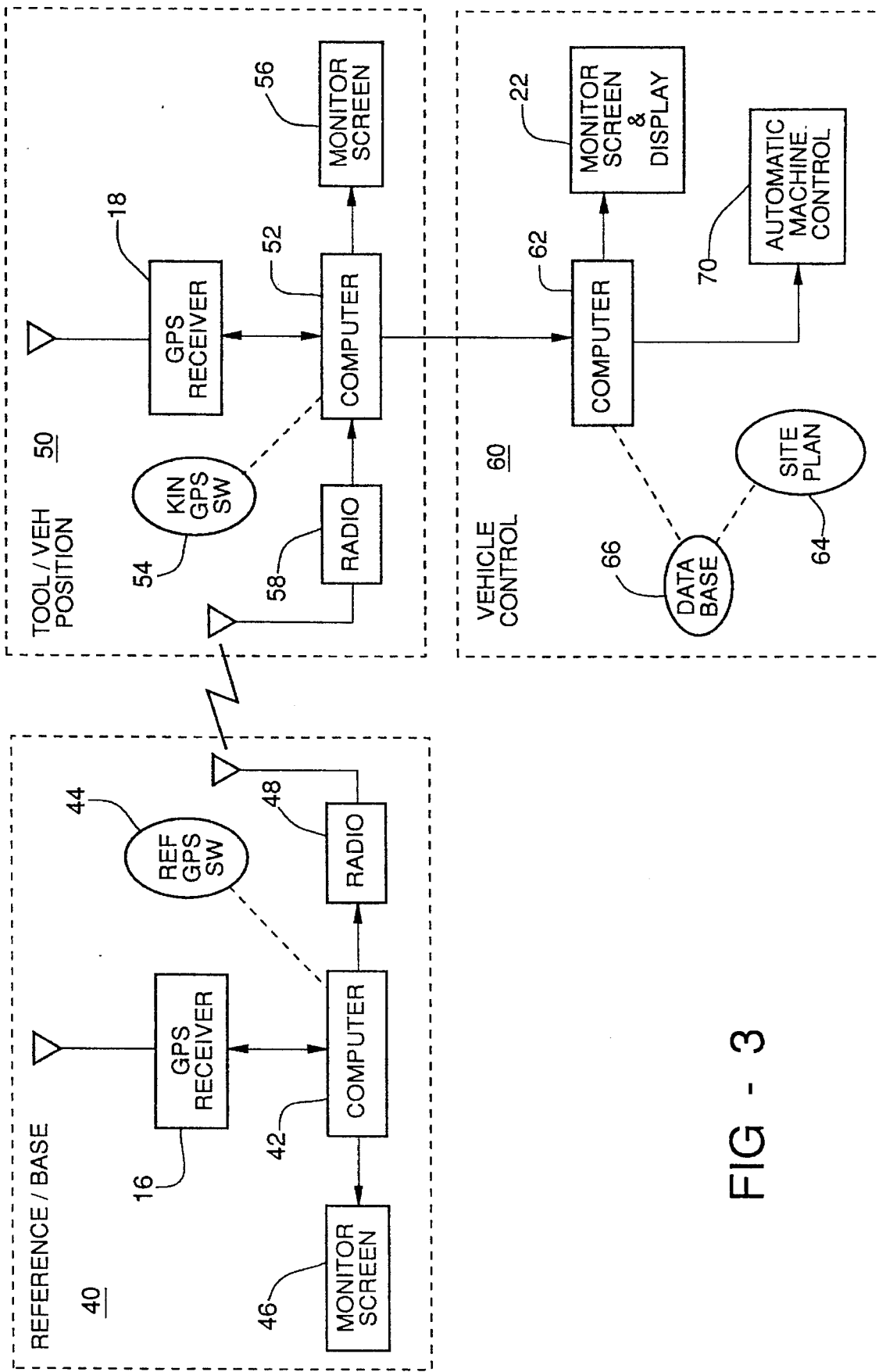
FIG. 3 is a detailed schematic representation of an embodiment of the system of FIG. 2 using GPS positioning.

Referring now to FIG. 3, a more detailed schematic of a system according to FIG. 2 is shown using kinematic GPS for position reference signals. A base reference module 40 and a position module 50 together determine the three-dimensional coordinates of the compacting machine relative to the site, while an update/control module 60 converts this position information into real time representations of the site which can be used to accurately monitor and control the machine.

Base reference module 40 includes a stationary GPS receiver 16; a computer 42 receiving input from receiver 16; reference receiver GPS software 44, temporarily or permanently stored in the computer 42; a standard computer monitor screen 46; and a digital transceiver-type radio 48 connected to the computer and capable of transmitting a digital data stream. In the illustrative embodiment base reference receiver 16 is a high accuracy kinematic GPS receiver; computer 42 for example is a 486DX computer with a hard drive, 8 megabyte RAM, two serial communication ports, a printer port, an external monitor port, and an external keyboard port; monitor screen 46 is a passive matrix color LCD; and radio 48 is a commercially available digital data transceiver.

Position module 50 comprises a matching kinematic GPS receiver 18, a matching computer 52 receiving input from receiver 18, kinematic GPS software 54 stored permanently or temporarily in computer 52, a standard computer monitor screen 56, and a matching transceiver-type digital radio 58 which receives signals from radio 48 in base reference module 40. In the illustrative embodiment position module 50 is located on the compacting machine to move with it over the work site.

Update/control module 60, also carried on board the compacting machine in the illustrated embodiment, includes an additional computer 62, receiving input from position module 50; one or more site models 64 digitally stored or loaded into the computer memory; a dynamic database update module 66, also stored or loaded into the memory of computer 62; and a color operator display screen 22 connected to the computer. Instead of, or in addition to, operator display 22, automatic machine controls 70 can be connected to the computer to receive signals which operate the machine in an automatic or semi-automatic manner in known fashion.

Although update/control module 60 is here shown mounted on the compacting machine, some or all portions may be stationed remotely. For example, computer 62, site model(s) 64, and dynamic database 66 could be connected by radio data link to position module 50 and operator display 22 or machine control interface 70. Position and site update information can then be broadcast to and from the machine for display or use by operators or supervisors both on and off the machine.

Base reference station 40 is fixed at a point of known three-dimensional coordinates relative to the work site. Through receiver 16 base reference station 40 receives position information from a GPS satellite constellation, using the reference GPS software 44 to derive an instantaneous error quantity or correction factor in known manner. This correction factor is broadcast from base station 40 to position station 50 on the compacting machine via radio link 48,58. Alternatively, raw position data can be transmitted from base station 40 to position station 50 via radio link 48,58, and processed by computer 52.

Machine-mounted receiver 18 receives position information from the satellite constellation, while the kinematic GPS software 54 combines the signal from receiver 18 and the correction factor from base reference 40 to determine the position of receiver 18 and the compacting machine relative to base reference 40 and the work site within a few centimeters. This position information is three-dimensional (e.g., latitude, longitude and elevation) and is available on a point-by-point basis according to the sampling rate of the GPS system.

Referring to update/control module 60, once the digitized plans or models of the site have been loaded into computer 62, dynamic database 66 generates signals representative of the difference between the actual and desired degree of compaction of the site to display this difference graphically on operator display screen 22 relative to the site topography. Using the position information received from position module 50, the database 66 also generates a graphic icon of the compacting machine superimposed on the site topography on display 22 corresponding to the actual position and direction of the machine on the site.

Because the sampling rate of the position module 50 results in a time/distance delay between position coordinate points as the compacting machine moves over the site, the dynamic database 66 of the present invention uses a differencing algorithm to determine and update in real-time the path of the machine.

With the knowledge of the compacting machine's exact position relative to the site, the degree of compaction of the site, and the machine's progress relative thereto, the operator can maneuver the compacting machine over the site to compact it without having to rely on intuitive feel, memory or physical site markers. And, as the operator moves the machine over the site the dynamic database 66 continues to read and manipulate incoming position information from module 50 to dynamically update both the machine's position relative to the site, the path of the machine over the site, and any change in degree of compaction effected by the machine's passage. This updated information is used to generate representations of the site and can be used to direct the operation of the compacting machine in real time to bring the actual, updated site model into conformity with the desired site model.

INDUSTRIAL APPLICABILITY

Figure 4:
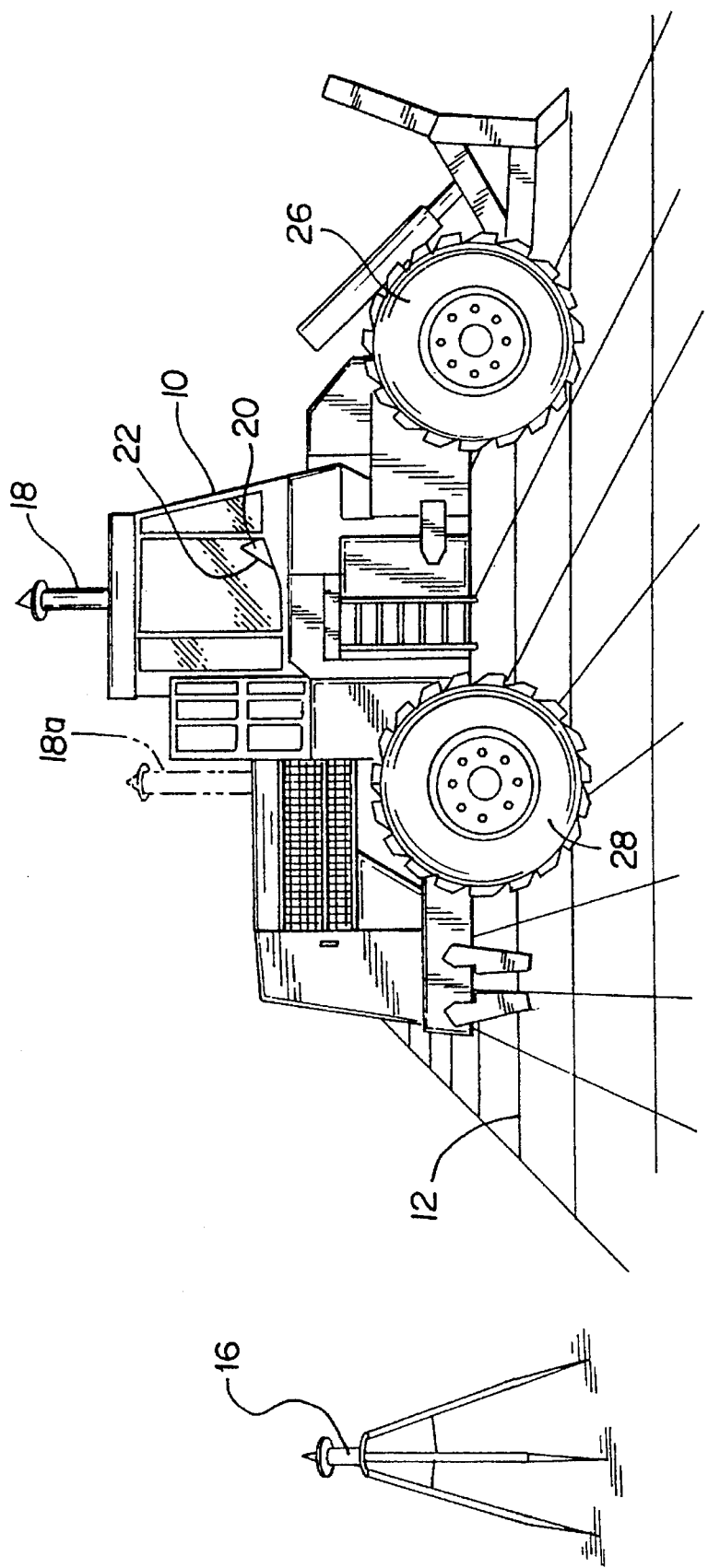
FIG. 4 is a schematic representation of a work site, compacting machine, and position and control system according to an illustrative compacting embodiment of the present invention.

Referring to FIG. 4, a compacting machine 10 is shown on location at a construction site 12. In the illustrative embodiment of FIG. 4 machine 10 is a wheeled landfill compactor. It will become apparent, however, that the principles and applications of the present invention will lend themselves to virtually any compacting machine with the capacity to move over and compact material on the site.

Compactor 10 is equipped in known fashion with available hydraulic or electrohydraulic controls (not shown). In the embodiment of FIG. 4 these controls operate, for example, steering and motor controls. Compactor 10 includes two spaced front wheels 26 which can be turned to control the direction of the compactor, and two spaced rear wheels 28 which are fixed relative to the body or frame of compactor 10. The compactor wheels 26,28 have wide, studded surfaces capable of compacting waste and trash in a landfill in known fashion. Compactor 10 is heavy, and may be weighted to increase the compacting force exerted by the wheels on the material which they traverse.

Machine 10 is equipped with a positioning system capable of determining the position of the machine and/or its compacting wheels with a high degree of accuracy, in the embodiment of FIG. 4 a phase differential GPS receiver 18 located on the machine at fixed, known coordinates relative to the site-contacting portions or "footprints" of the wheels. Machine-mounted receiver 18 receives position signals from a GPS constellation 14 and an error/correction signal from base reference 16 via radio link 48,58 as described in FIG. 3. Machine-mounted receiver 18 uses both the satellite signals and the error/correction signal from base reference 16 to accurately determine its position in three-dimensional space. Alternatively, raw position data can be transmitted from base reference 16, and processed in known fashion by the machine-mounted receiver system to achieve the same result. Information on kinematic GPS and a system suitable for use with the present invention can be found, for example, in U.S. Pat. No. 4,812,991 dated Mar. 14, 1989 and U.S. Pat. No. 4,963,889 dated Oct. 16, 1990, both to Hatch. Using kinematic GPS or other suitable three-dimensional position signals from an external reference, the location of receiver 18 and compactor 10 can be accurately determined on a point-by-point basis within a few centimeters as compactor 10 moves over site 12. The present sampling rate for coordinate points using the illustrative positioning system is approximately one point per second.

The coordinates of base receiver 16 can be determined in any known fashion, such as GPS positioning or conventional surveying. Steps are also being taken in this and other countries to place GPS references at fixed, nationally surveyed sites such as airports. If site 12 is within range (currently approximately 20 miles) of such a nationally surveyed site and local GPS receiver, that local receiver can be used as a base reference. Optionally, a portable receiver such as 16, having a tripod-mounted GPS receiver, and a rebroadcast transmitter can be used. The portable receiver 16 is surveyed in place at or near site 12 as previously discussed.

Also shown in schematic form on the compactor 10 of FIG. 4 is an on-board digital computer 20 including a dynamic database and a color graphic operator display 22. Computer 20 is connected to receiver 18 to continuously receive compactor position information. Although it is not necessary to place computer 20, the dynamic database and the operator display on compactor 10, this is currently a preferred embodiment and simplifies illustration.

In the illustrated embodiment of FIG. 4, the machine-mounted position receiver 18 is positioned on the cab of compactor 10 at a fixed, known distance from the ground-engaging portions or "footprints" of the compactor wheels. Since the wheels are actually in contact with the site topography, receiver 18 is calibrated to take this elevational difference into account; in effect, the cab-mounted receiver 18 is perceived by the system as being level with the site topography over which the compactor is operating.

While the use of a single position receiver 18 at a fixed distance from the compactor's site-contacting wheels is an effective and sturdy mounting arrangement, in certain applications it may be preferable to use different mounting arrangements for the positioning receiver. For example, the current direction of the compactor relative to the site plan, as shown on display 22 by icon 82 and direction indicator 84 in FIG. 6A, may be off by a slight time lag vector, depending on the sampling rate of the receiver 18 and the machine's rate of directional change. With only one position receiver 18 mounted on tractor 10, machine direction at a single point cannot be determined since the machine effectively pivots around the single receiver. This problem is solved by placing a second position receiver on the machine, spaced from the first, for a directional reference point.

Additionally, the lengthwise distance between the wheels 26,28 and the cab-mounted GPS receiver 18 in FIG. 4 creates a slight real time offset in resolving the position of the wheels as they compact the site. In most cases this delay is negligible, since the GPS position closely precedes or follows the wheels and essentially matches the compacting operation. On larger machines, however, it may be preferable to mount one or more position receivers 18*a* directly in line with one or more of the wheels as shown in FIG. 4 in phantom.

Figure 5A:
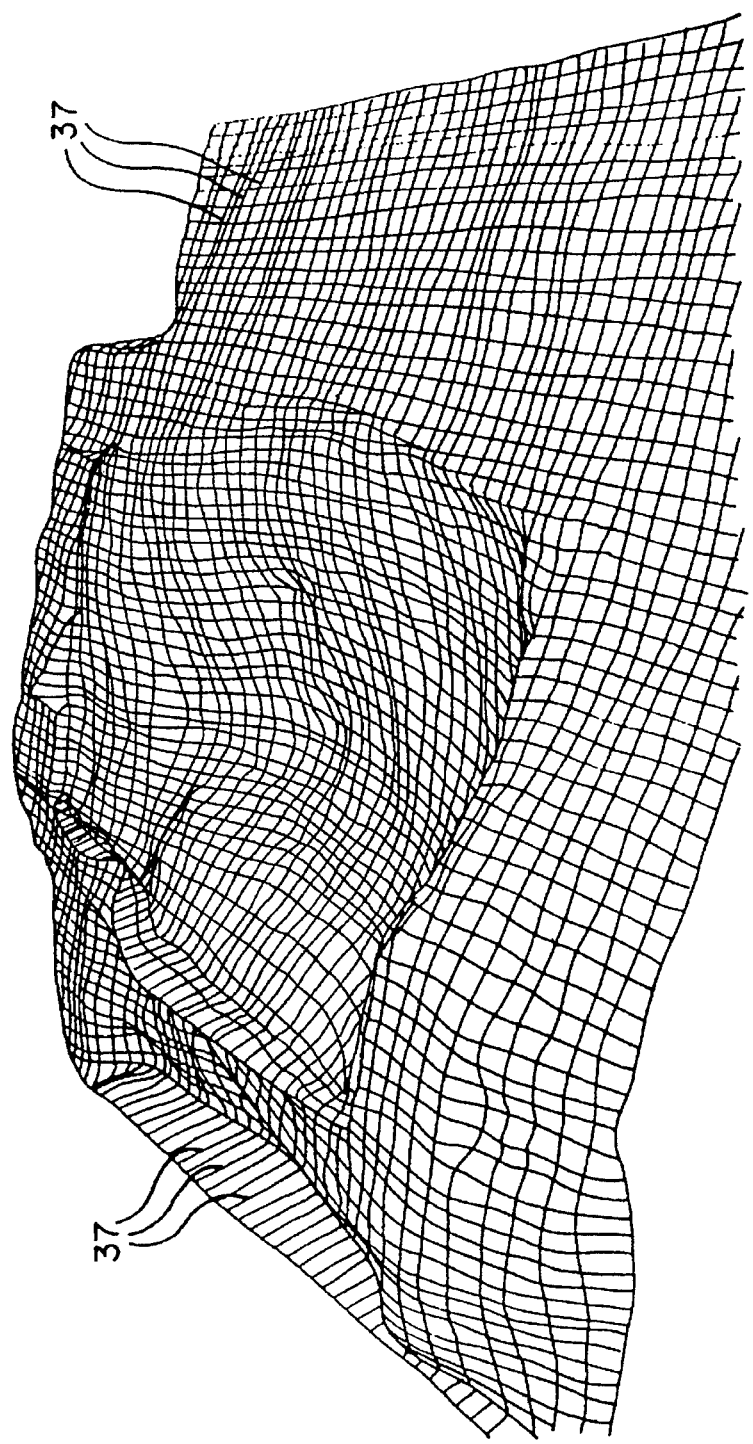
FIGS. 5A–5B are graphic reproductions of exemplary topographical landfill site models such as used with the present invention.
Figure 5B:
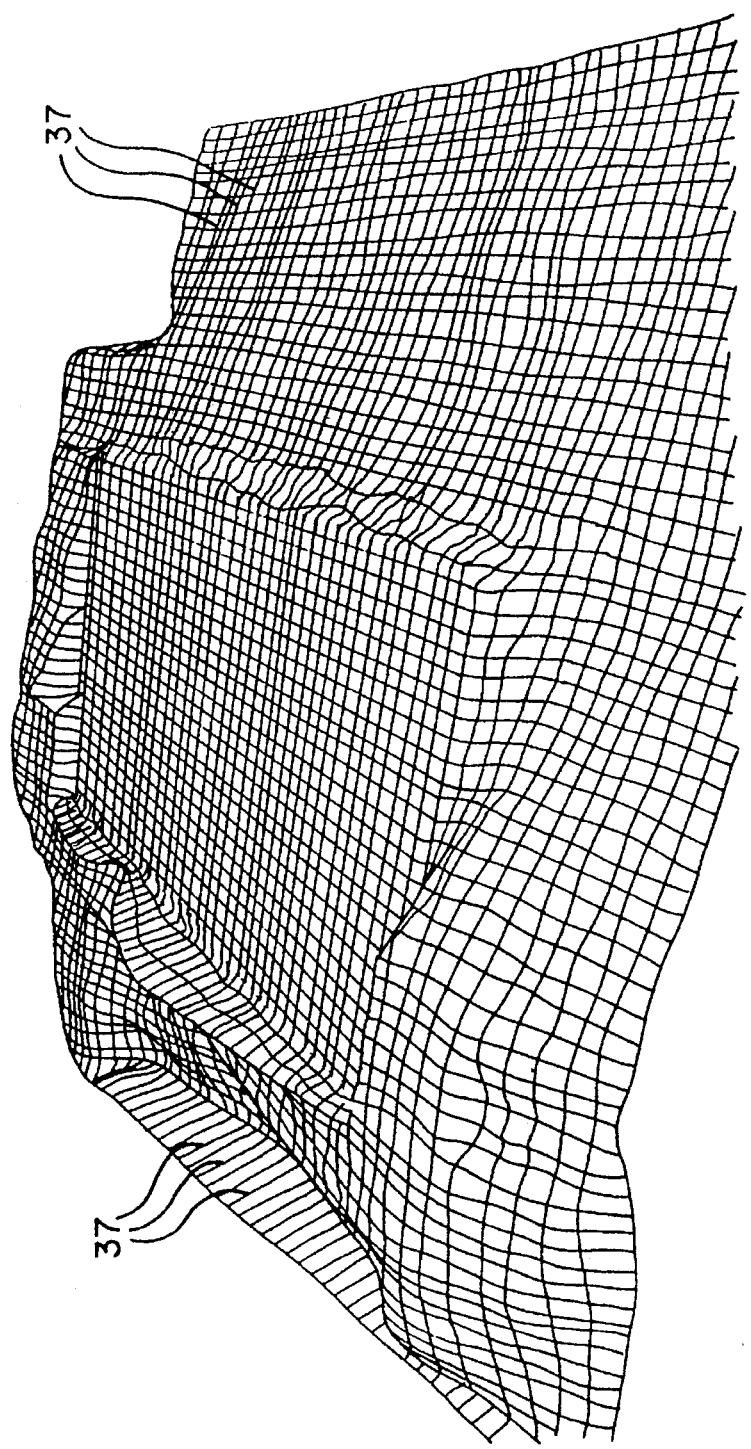

Referring to FIGS. 5A–5B, an illustrative landfill site has previously been surveyed to provide a detailed topographic blueprint (not shown) showing the initial landfill topography in plan view. The creation of topographic blueprints of sites such as landfills and construction sites with optical surveying and other techniques is a well-known art; reference points are plotted on a grid over the site, and then connected or filled in to produce the site contours on the blueprint. The greater the number of reference points taken, the greater the detail of the map.

Systems and software are currently available to produce digitized, two- or three-dimensional maps of a topographic site. For example, the topographic blueprint can be converted into a three-dimensional digitized model of the initially surveyed landfill topography as shown at 36 in FIG. 5A and of a subsequent site topography, for example after the landfill has been substantially filled in, as shown at 38 in FIG. 5B. The site contours can be overlaid with a reference grid of uniform grid elements 37 in known fashion. The digitized site plans can be superimposed, viewed in two or three dimensions from various angles (e.g., plan or profile), and color coded to designate areas in which the site needs to be filled in or compacted.

However the site is surveyed, and whether the machine operators and their supervisors are working from a paper blueprint or a digitized site plan, the prior practice is to simply add material to the landfill and monitor the compacting operation by feel, memory and/or physical markers. Periodically during this process the operator's progress may be manually checked to coordinate the compacting operations in static, step-by-step fashion until uniform, satisfactory compaction is achieved. This manual periodic updating and checking is labor-intensive, time consuming, and inherently provides less than ideal results.

Moreover, when it is desired to revise the blueprint or digitized site model as an indicator of progress to date and work to go, the site must again be statically surveyed and the blueprint or digitized site model manually corrected off-site in a non-real time manner.

To eliminate the drawbacks of prior art monitoring and static surveying and updating methods, the present invention integrates accurate three-dimensional positioning and digitized site mapping with a dynamically updated database and operator display for real-time monitoring and control of the site 12 and compactor 10. The dynamic site database determines the difference between the actual and desired site models in terms of degree of compaction of the site topography, receives kinematic GPS position information for compactor 10 relative to site 12 from position receiver 18, displays both the site model and the current machine position to the operator on display 22, and updates the actual site model, machine position and display in real time with a degree of accuracy measured in centimeters. The operator accordingly achieves unprecedented knowledge of and control over the compacting operations in real time, on-site, and can accordingly finish the job with virtually no interruption or need to check or re-survey the site.

Referring now to FIGS. 6A–6B and 7A–7I, an application of the present invention is illustrated for a landfill compacting operation.

In machine compacting, for example of landfills, earth, or freshly laid asphalt, the completion of the compacting operation is typically a function of the number of passes of the compactor over the surface to be compacted. The desired degree of compaction can be determined, for example, by running a compactor over a test area of uncompacted material and empirically determining a suitable pass-count standard. By way of illustrative example, in a landfill compacting operation it is desirable that a machine such as a large, heavy compactor with studded rollers or wheels pass over a portion of the landfill to compress new refuse to some predetermined degree in accordance with local compaction regulations or sound compacting practices. It is therefore important for the operator of the compactor to know: whether he has been over a given unit area or grid element of the landfill site; how many times the compactor has been over a given grid element on the site; the extent to which the material has been successfully compacted within a grid element on the site; and, whether uncompacted material has been added to a particular grid element since the last compacting pass.

At the start of the compacting operation, the actual site model may initially comprise a three-dimensional survey or map of the site topography in an uncompacted state, for example the digitized three-dimensional site model of FIG. 5A for a landfill application. As compacting operations progress, the actual site model more specifically comprises the actual degree of compaction of the material on the surface of the site, as measured for example by compaction pass count and/or elevation change. The actual site model is dynamic in that it changes each time new material is added or old material is further compacted from its previous state.

The desired site model comprises a predetermined, desired degree of compaction for material on the surface of the site. For example, where the desired degree of compaction is predetermined to be a total of five passes of the compactor over a previously uncompacted area, the desired site model is a pass count of five passes over a previously uncompacted area. When that pass count is reached, the desired site model is achieved. The difference between the actual and desired site models at any point on the site comprises the difference between the actual degree of compaction and the desired degree of compaction at that point.

The actual site model accordingly fluctuates between an uncompacted state of the site material and the desired degree of compaction. Whenever new, uncompacted material is detected in a previously compacted area of the site, the actual site model returns or decrements to an uncompacted state for that area.

Using the method and apparatus of the present invention, all of this information can be determined and updated in real time, with a great degree of accuracy and with a user-friendly display for the operator.

Figure 6A:
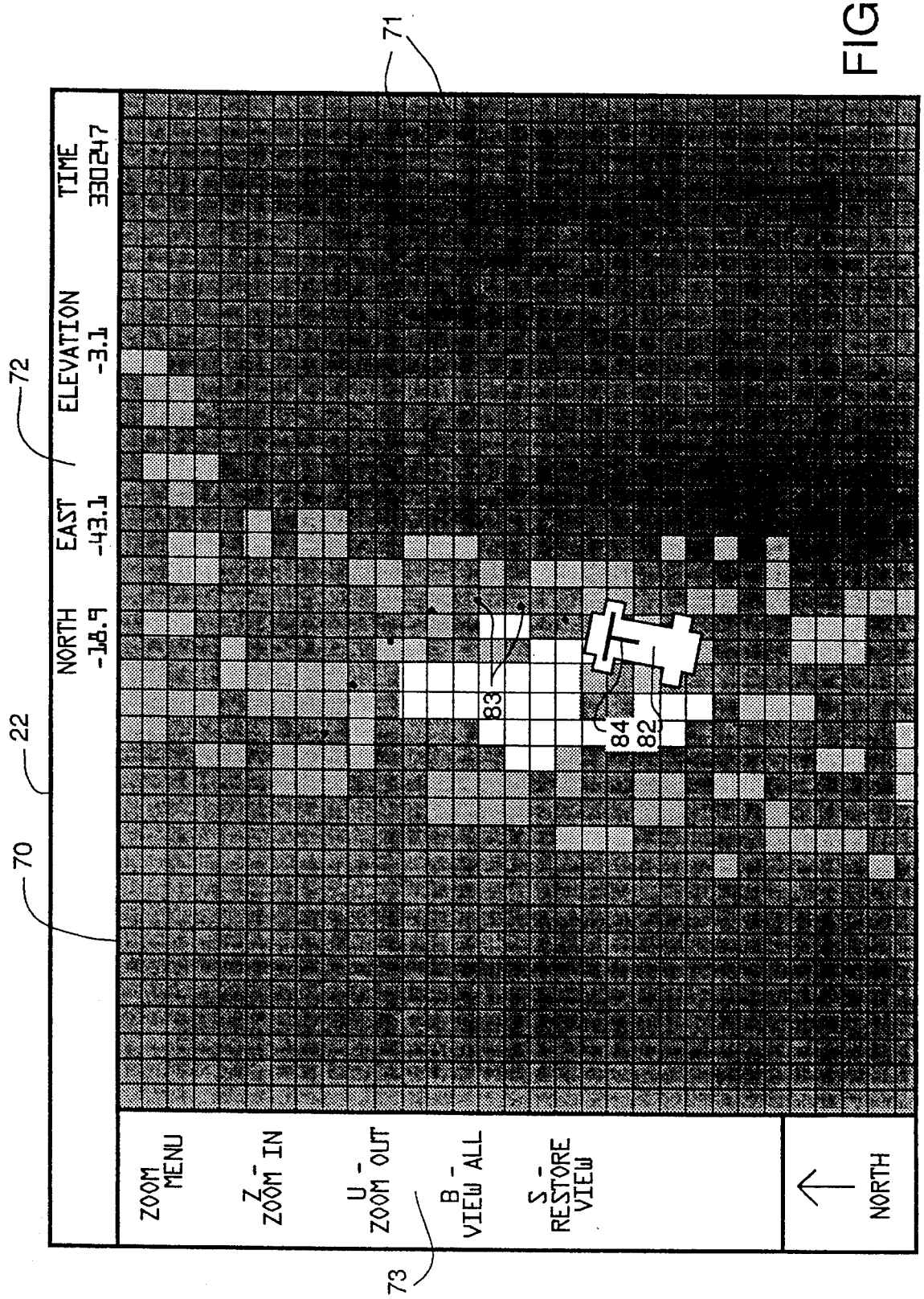
FIGS. 6A–6B are representative real-time operator displays generated according to the present invention for a landfill compacting operation.

FIG. 6A shows a sample operator display 22 for a compacting operation according to the present invention. Using a digitized model of the landfill site with a superimposed set of grid elements, and a compactor equipped with position module 50 and update/control module 60 in FIG. 3, the operator first initializes the operator display 22, typically upon entering the landfill site. In landfill compacting the probable activity field for a day is typically small, on the order of a few hundred or thousand square meters. For purposes of illustration in FIG. 6A the site database is arbitrarily set at approximately 30 meters by 40 meters. This can be varied depending on the nature of the particular compacting operation. This is smaller than the total area of a typical landfill, but for a single day the compactor operator needs a database only for the portion of the landfill in which he will be operating.

In a large landfill application, individual site databases can be parceled out to each operator at the beginning of a day, the updated databases for each portion of the landfill gathered at the end of the day and recorrelated relative to the overall landfill for the next day's work.

In the illustrated embodiment the system arbitrarily assumes upon start up and initialization that the compactor is in the center of the site, divided into a grid of squares of fixed area, e.g., one square meter. The operator can center the compactor with respect to the designated site either by driving to a designated central marker, or using GPS or similar positioning techniques.

Once arrived at the center of the site, the operator initializes the display and is presented on screen 22 with a site database in plan window 70 such as that shown in FIG. 6A, marked off in a grid pattern of elements 71 initially all one color; e.g., black to indicate that no passes have yet been made over that site. A position coordinate window 72 displays the compactor's current position in latitude, longitude, elevation and time. A menu window 73 displays zoom options in the display software which allow the operator to expand or contract the amount of the site displayed in plan window 70. The compactor position is denoted by an icon 82 with direction indicator 84.

Prior to the beginning of work on the site, a compaction standard (here a pass count) is set to denote the desired degree of compaction of the site. For example, it may be determined that five passes of the compactor over uncompacted material on any one grid element are necessary for that grid element to be adequately compacted. As the operator traverses the site, each pass of the compactor wheels over a grid element will result in a database update in real-time. The grid elements of the site display can be visually updated in a variety of ways to show the difference between the actual and desired degree of compaction, e.g., shading, cross-hatching, coloring or "painting" (where a color display is used), or in any other known manner to provide an indicator to the operator of the compaction status of the grid elements. In the illustrated embodiment of FIG. 6A the grid changes color to denote the actual degree of compaction in terms of how many passes have been made; e.g., the darkest to lightest shading of grid elements 71 represent black for no passes, yellow for one pass, green for two passes, red for three passes, blue for four passes, and white indicating satisfactory compaction at five passes. The objective is to make the entire screen white as the operator display is updated in real-time to indicate the number of passes over each grid element.

As an additional aid to the operator, the approximate path of the compactor as measured by coordinate samples can be shown on display 22, in FIG. 6A denoted by a series of dots 83 where each position reading was taken.

Figure 6B:
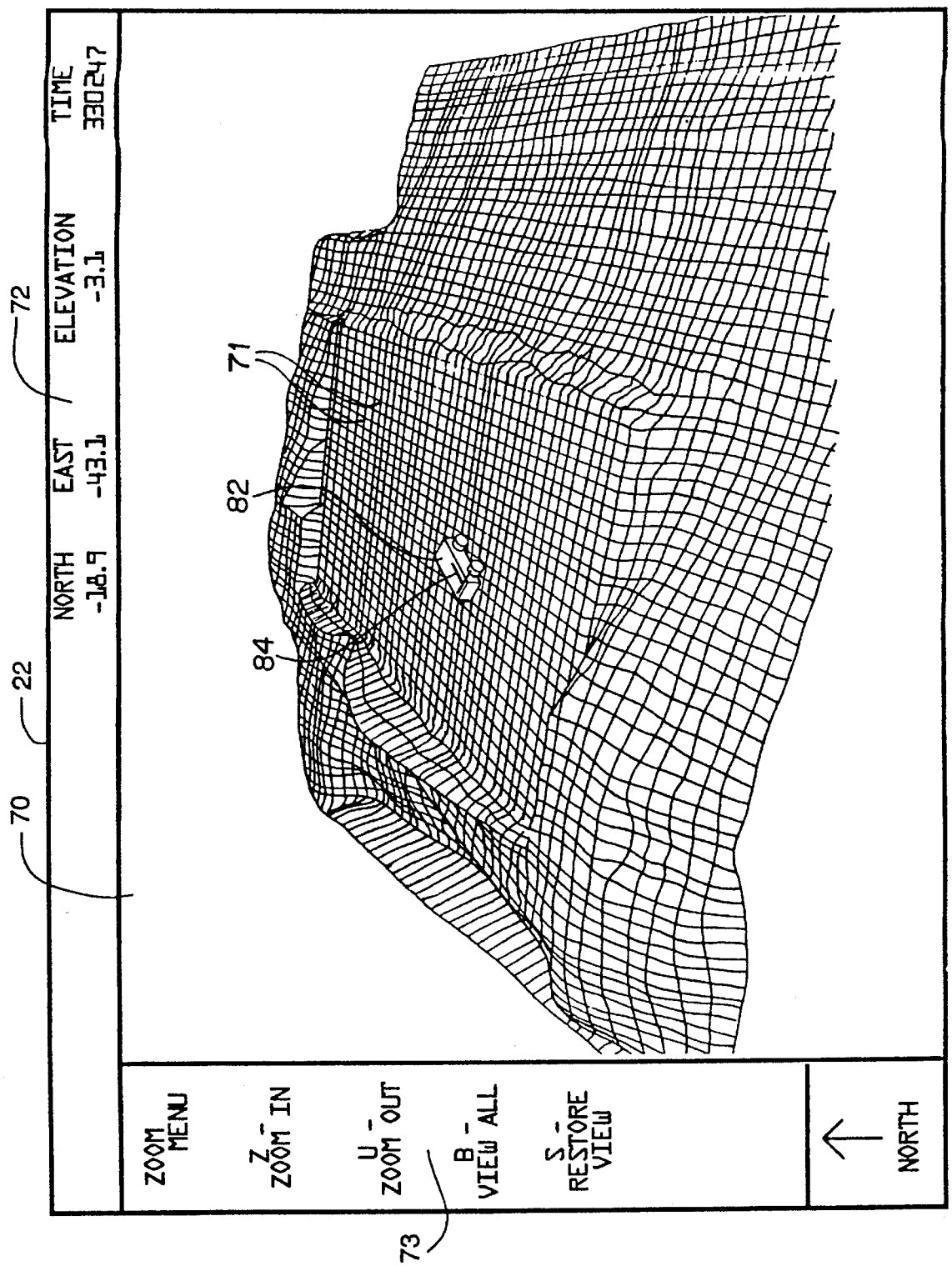

FIG. 6B is one possible alternate display in which the two-dimensional plan view of the site and compactor position of FIG. 6A is shown in three dimensions in window 70.

It is necessary to provide some protocol for determining when a sufficient portion of a grid element has been passed over by a compactor wheel to warrant a status update for that grid element and register a compacting pass on the operator display. For the illustrated compactor with two or more spaced compacting wheels, the following illustrative method can be used. The size of each grid element on the digitized site plan is preferably matched to the width of a compacting wheel; e.g., for one meter wide wheels the grid elements should be set to one square meter. Accordingly, if the center of the wheel crosses a grid element at any point, it is assumed that at least one half of the grid element has been compacted and can be updated on the display. These dimensions and margins can be varied as desired, however.

The coordinates of the ground-contacting surfaces ("footprints") of the fixed rear compactor wheels are known relative to the position receiver on the compactor. Each coordinate sampling by the positioning system can accordingly be used to determine the precise location of the center of each wheel at that point.

In the illustrated embodiment the positions of the footprints of the rear compactor wheels are tracked, since in a typical compactor the rear compacting wheels are fixed relative to the cab and position receiver 18. Moreover, compactors often operate in a substantially linear, back and forth manner over the site, without sharp turns which would tend to disturb previously compacted material. The paths of the evenly-spaced front and rear wheels essentially overlap, such that the compacting path of the front wheels can be accurately estimated by the paths of the fixed rear wheels.

The time lag between coordinate samplings as the compactor wheels travel over several grid elements must also be taken into consideration to accurately determine the entire real-time path of the compactor. In a compactor with compacting wheels whose width approximates the width of the site model grid elements, a preferred method shown in the illustrated embodiment of the present invention uses the well-known Bresenham's algorithm to produce a continuous line approximating the path of each compactor wheel over the grid elements between coordinate samplings. Then, if the sampling rate only provides a coordinate "point" every three or four grid elements, a line approximation is made of the compactor wheel paths over those three or four grid elements (corresponding to the center of the wheels), and every grid element along that line is given a status update and visual change on the operator display.

Figure 7A:
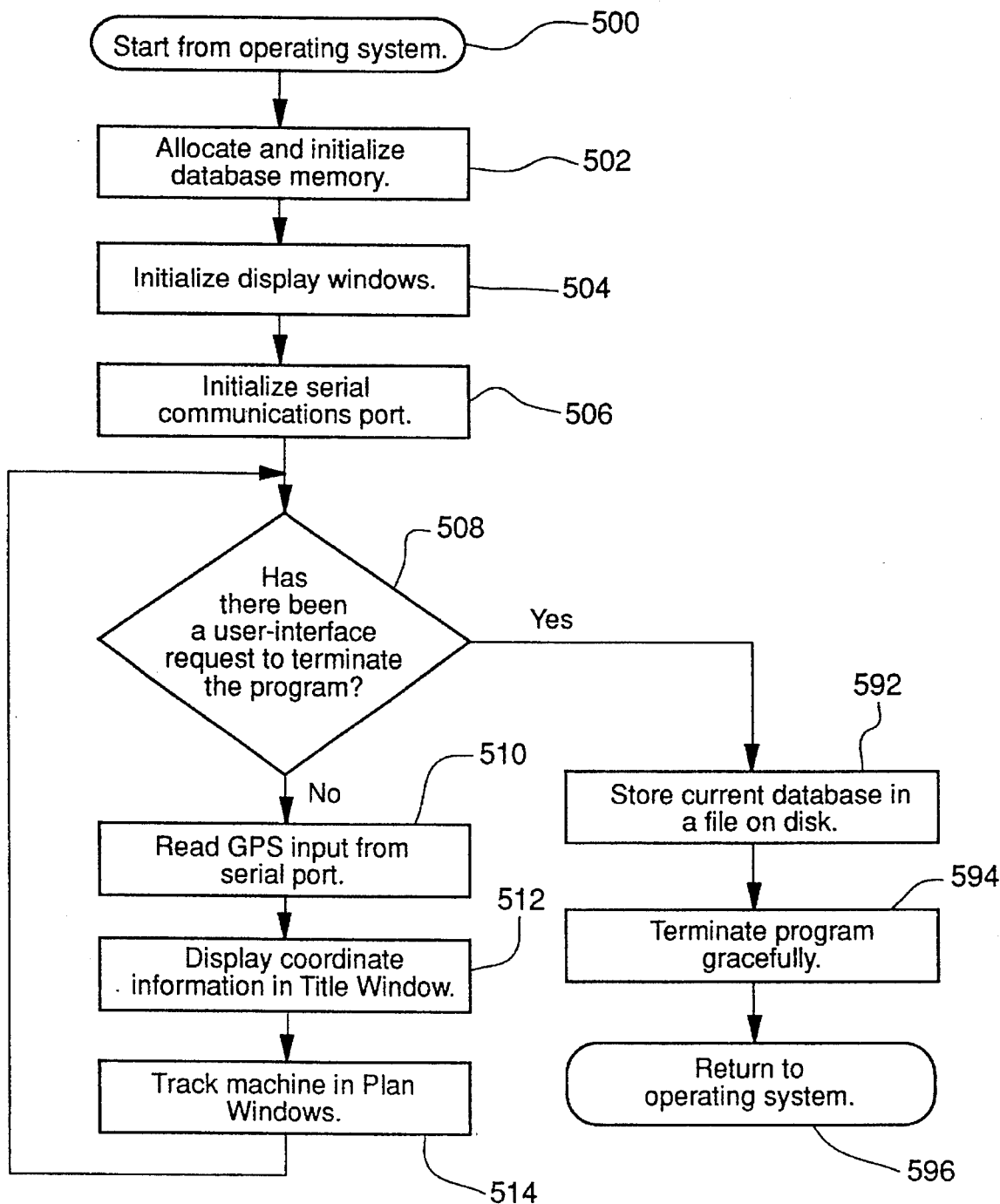

Referring to FIG. 7A, the method of the present invention as applied to a landfill compacting application is schematically shown. At step 500 the operator starts from the computer operating system. At step 502 database memory is allocated and initialized. At step 504 the various displays are initialized. In step 506 the serial communications port between the positioning module and update/control module is initialized. At step 508 the system determines whether there has been an operator request to terminate the program, for example from a user interface device such as a computer keyboard. This option is available to the operator at any time, and if the system determines that such a request to terminate has been received, it proceeds to step 592 and stores the current site database in a file on a suitable memory device, for example a disk. At steps 594,596 the operator is returned to the computer operating system.

If, however, the system determines at step 508 that there has not been a request to terminate the program, it proceeds to step 510 where a position coordinate is read from the serial port connection between the position module 50 and update/control module 60 of FIG. 3, in the illustrated embodiment a three-dimensional GPS-determined coordinate point. At step 512 the position of the compactor is displayed (FIG. 6A) in window 72 on operator display screen 22 as three-dimensional coordinates relative to base reference 16.

For the first system loop at step 514 the position of the compactor is initially displayed on the operator screen 22 as icon 82 in the middle of the plan display 70. In the illustrated embodiment of FIG. 6A the site database displayed at 70 is approximately 30×40 meters, the compactor has two separate rear compacting wheels, each wheel one meter wide, and the grid element size is fixed at one square meter.

Figure 7B:
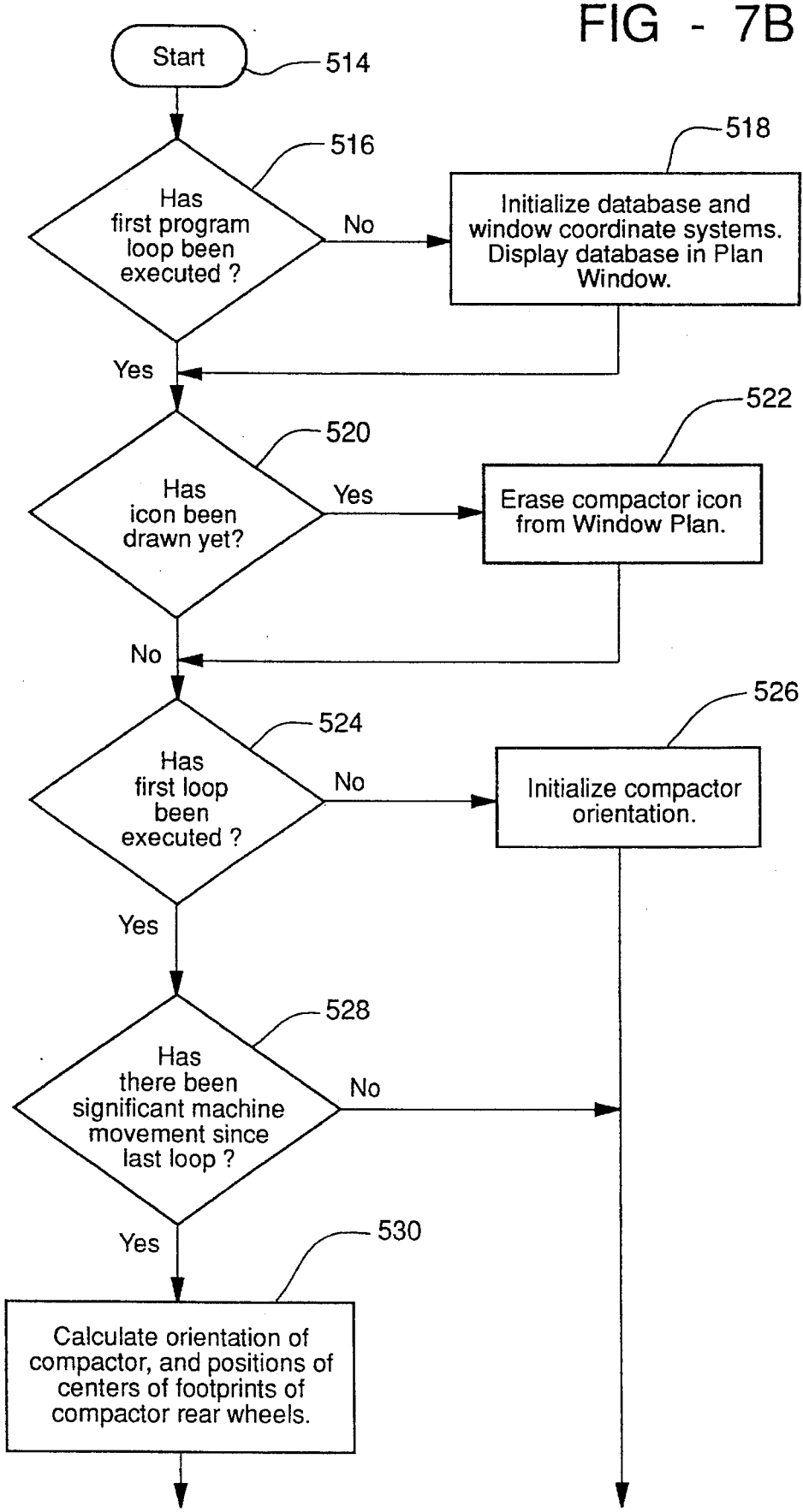
Figure 7C:
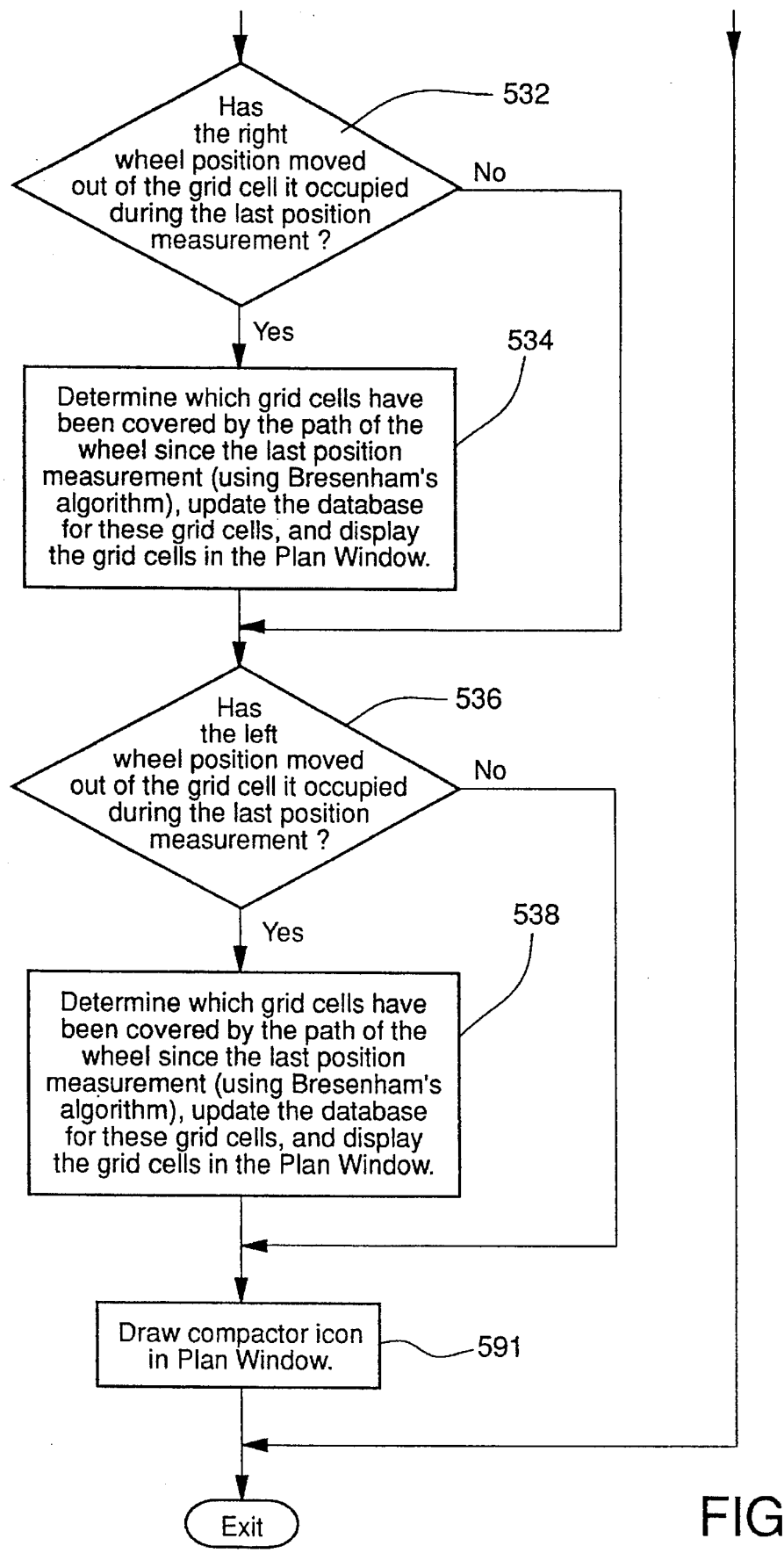

In step 514 a subroutine shown in FIGS. 7B-7C draws the displays and icon, determines the orientation of the compactor and the position of the centers of the "footprints" or ground-contacting portions of the rear compactor wheels, tracks the path of the rear compactor wheels over the site database, and updates the compaction status of the grid elements in the path of the compactor.

Referring to FIG. 7B, at step 516 the system determines whether the first program loop has been executed. If not, the site database and display window coordinate systems are initialized and displayed on operator screen 22 at step 518. After the first program loop has been executed and the site database initialized and displayed on the operator screen, the system at step 520 checks whether icon 82 has already been drawn. If yes, the previous icon 82 is erased from the display at step 522. If the icon has not yet been drawn, at step 524 the system determines whether the first loop has been executed; if not, the orientation of the compactor is initialized at step 526 and the system completes the overall program loop of FIG. 7A. If at step 524 the system determines that the first loop has already been executed, the system proceeds in FIG. 7B to step 528 to determine whether the compactor has moved since the last program loop. If the machine has not moved, the system exits the subroutine of FIG. 7B and returns to complete the overall program loop of FIG. 7A from step 514.

If the machine has moved relative to the site database since the last loop, the system proceeds to step 530 in FIG. 7B to calculate the positions of the centers of the footprints of the rear compactor wheels, and from those the orientation of the compactor. At step 532 in FIG. 7C the system determines whether the right rear compactor wheel position has moved out of the grid element it occupied during the last position measurement. If it has, at step 534 the path of the right wheel between the previous and current coordinate samplings is determined using the well-known Bresenham's algorithm to approximate a continuous line path of the right wheel over the grid elements on the display 22. The grid elements of the site database over which the right wheel has passed are then updated to indicate a compaction pass, and grid elements are updated on the visual display window 70 with a color change or other visual indicator.

If at step 532 the right wheel has not moved since the last position measurement, or after the movement of the right wheel has been tracked and the site database updated at step 534, the process is repeated for the left wheel of the compactor at steps 536,538. At step 591 the updated compactor icon is then redrawn on the display to show its current position and direction. The subroutine of step 514 in FIG. 9 is then completed, and the system returns to repeat the program loop of FIG. 7A, either proceeding to step 510 for another GPS coordinate sampling, or terminating in response to an operator request.

Figure 7D:
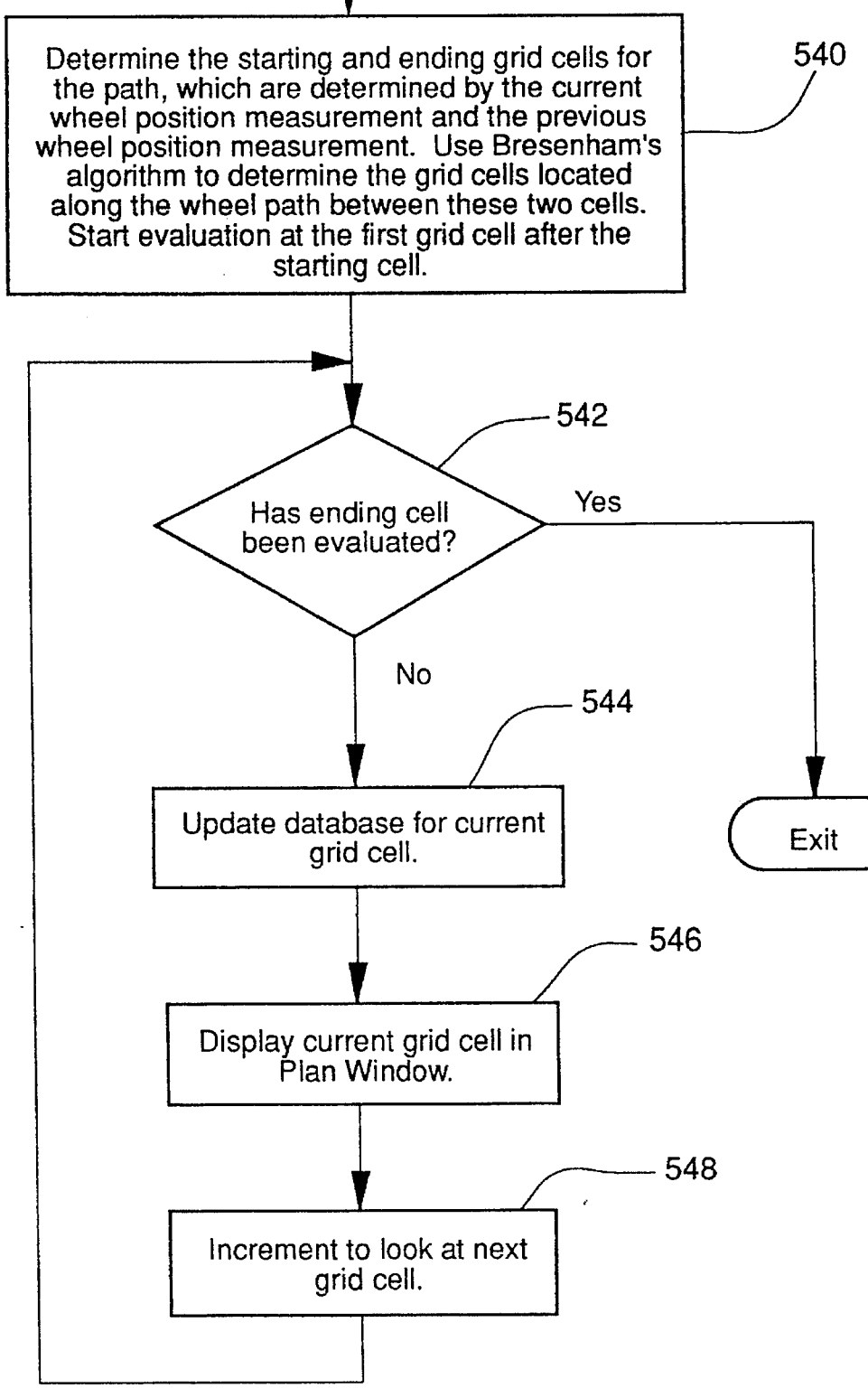

In FIG. 7D a subroutine for the wheel tracking and site updating operations of steps 534 and 538 is shown. At step 540 the starting and ending grid cells for the wheel whose path is being determined are defined by the current wheel position measurement and the previous wheel position measurement taken by the GPS or other positioning system. The Bresenham's algorithm is applied to determine the grid cells located along the path between the starting and ending grid cells, and the system proceeds to steps 544,546,548 to evaluate/update the status of each grid element therebetween, beginning with the first grid element after the starting grid element. At step 542 the system determines whether the ending grid element has been evaluated; if not, it proceeds to step 544 where the grid element being evaluated is updated according to a subroutine in FIG. 7E. Once the compaction status of the current grid element has been updated at step 544, the updated grid element is displayed on the operator screen 22 at step 546, and at step 548 the system is incremented to evaluate the next grid element in the path between the starting and ending grid elements. This loop repeats itself until the ending grid element has been evaluated and updated, at which point the subroutine of FIG. 7D is exited and the program returns to step 591 in FIG. 7C to draw the updated compactor icon on the display.

Figure 7E:
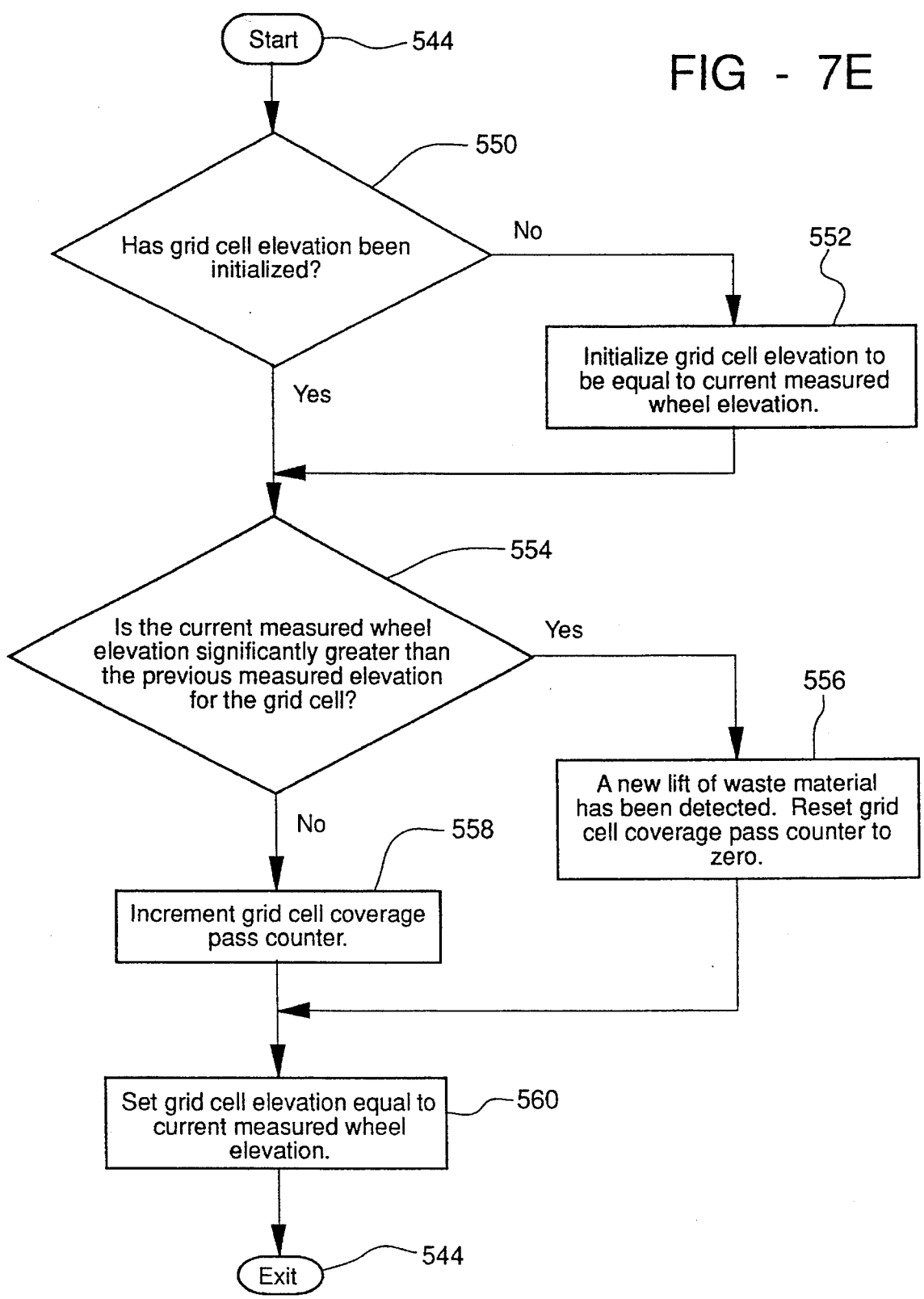

In FIG. 7E the subroutine for the site database update step 544 of FIG. 7D is shown. Referring to FIG. 7E, at step 550 the system determines whether the elevation of the current grid element has been initialized. If not, the elevation or z-axis coordinate of that grid element is initialized as equal to the currently measured compactor wheel elevation at that point. If the grid element elevation has already been initialized, the system proceeds to step 554 to compare the currently measured wheel elevation to the previously measured elevation for that grid element. If the currently measured wheel elevation on that grid element is not greater than the previously measured elevation, the system determines that no new material has been added and that grid element can be incremented at step 558 to register a compaction pass and increment the pass count for that grid element. If at step 554 the currently measured wheel elevation is greater than the previously measured elevation (discounting, for example, minor resilient expansion of the material compressed in the last pass, within limits determined by the user) the system determines at step 556 that a new lift of asphalt, earth or waste material has been detected for that grid element, and the pass count status for that grid element is re-zeroed to indicate the need for a complete new series of compaction passes. At step 560 the elevation of the current grid element is then set equal to the currently measured elevation of the compactor wheel for comparison at step 554 on the next pass of the compactor over that grid element. The subroutine of FIG. 7E is then exited for completion of the subroutine loop of FIG. 7D.

Figure 7F:
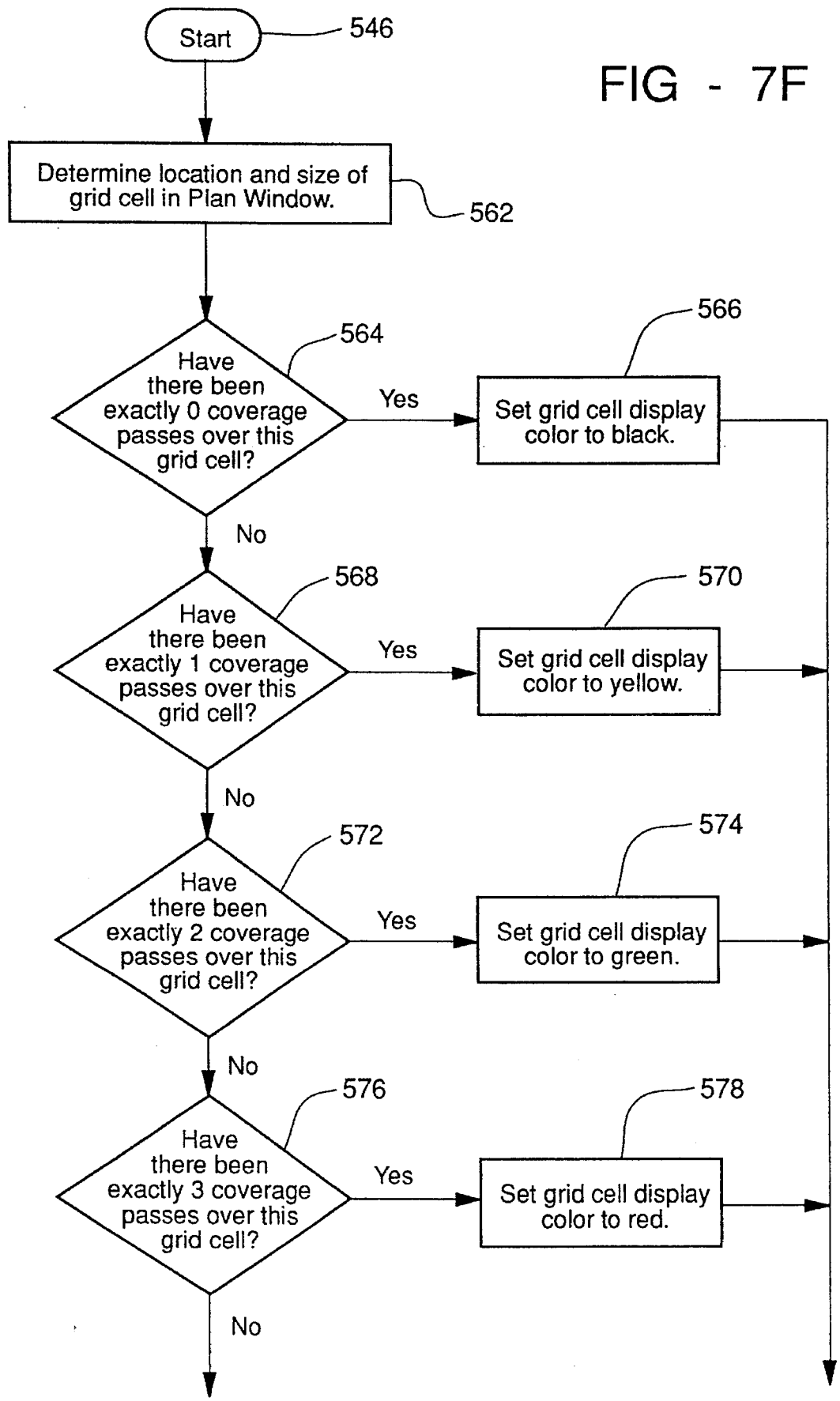
Figure 7G:
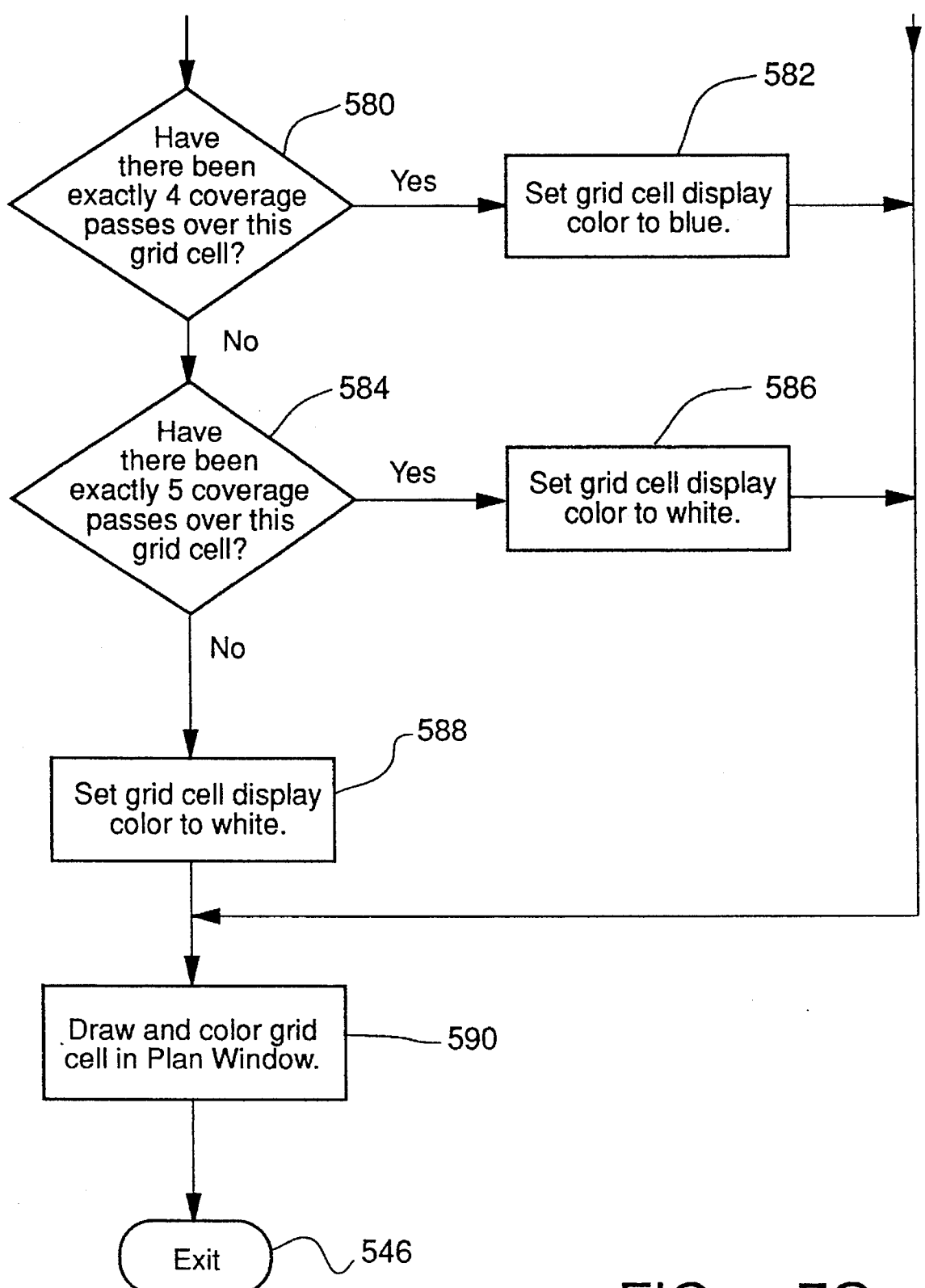

Referring now to FIGS. 7F–7G, a subroutine for step 546 of FIG. 7D is shown. Once the pass count for the current grid element has been updated at step 544 in FIG. 7D using the subroutine of FIG. 7E, the system in step 546 enters the subroutine of FIGS. 7F–7G and at step 562 first determines the location and size of the current grid element on the site database displayed in plan window 70 on the operator screen 22. At step 564, if the pass count for the grid element is zero, the grid element is set, for example, to be colored black on the display at step 566. If the pass count for that grid element is determined to be one at step 568, the grid element is set, for example, to be colored yellow on the display at step 570. If the pass count for that grid element is determined at step 572 to be two, the grid element is set, for example, to be colored green at step 574. If the pass count is determined at step 576 to be three, the grid element is set, for example, to be colored red at step 578. If the pass count for that grid element is determined at step 580 to be four, the grid element is set, for example, to be colored blue at step 582. If the pass count is determined at step 584 to be five (in the illustrated embodiment the desired pass count for a completed compacting operation), the grid is set, for example, to be colored white at step 586. If the pass count for that area is greater than the minimum pass count for a completed compaction operation, the grid element is set to be colored white at step 588.

Once the grid element has been updated according to the current pass count, the grid element is drawn and colored on the operator display screen 22 at step 590. It will be understood that the grid elements can be visually updated on screen 22 other than by coloring; e.g., by cross-hatching, shading or other visual indication.

While the tracking and updating method of FIGS. 7A–7G are illustrated for a compactor having two or more spaced compacting wheels whose width approximates the width of the site grid elements, the method can also be used for a compactor with a single wheel or roller as will be understood by those skilled in the art. The method of FIGS. 7A–7G can also be used where the width of the compactor wheel or roller does not match the width of the grid elements of the site model. However, where the width of the compacting wheel or roller is significantly greater than the width of a single grid element, for example where it covers several grid elements at one time, an alternate method for tracking the path of a compacting wheel or roller may be employed.

Figure 7H:
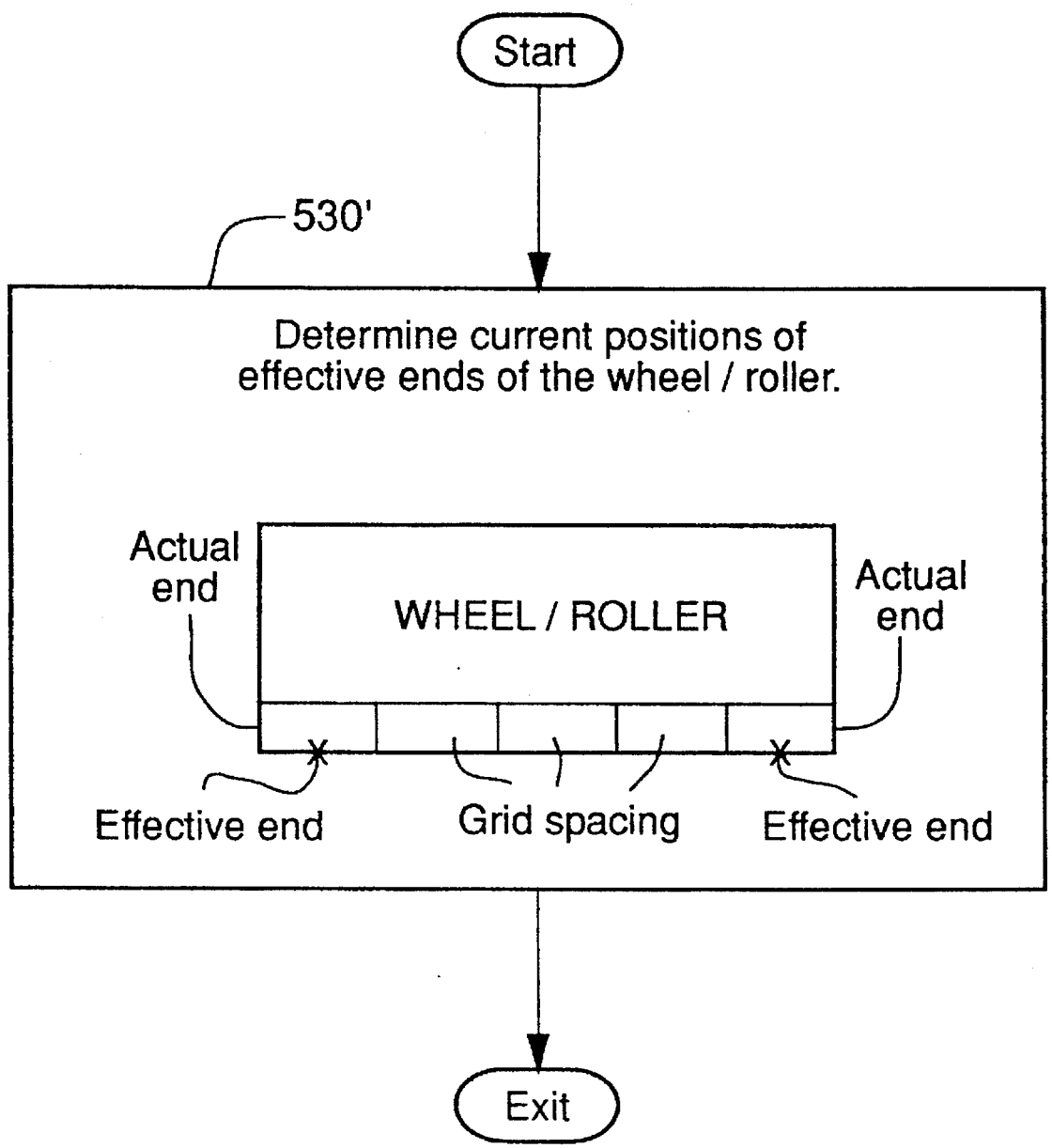
Figure 71:
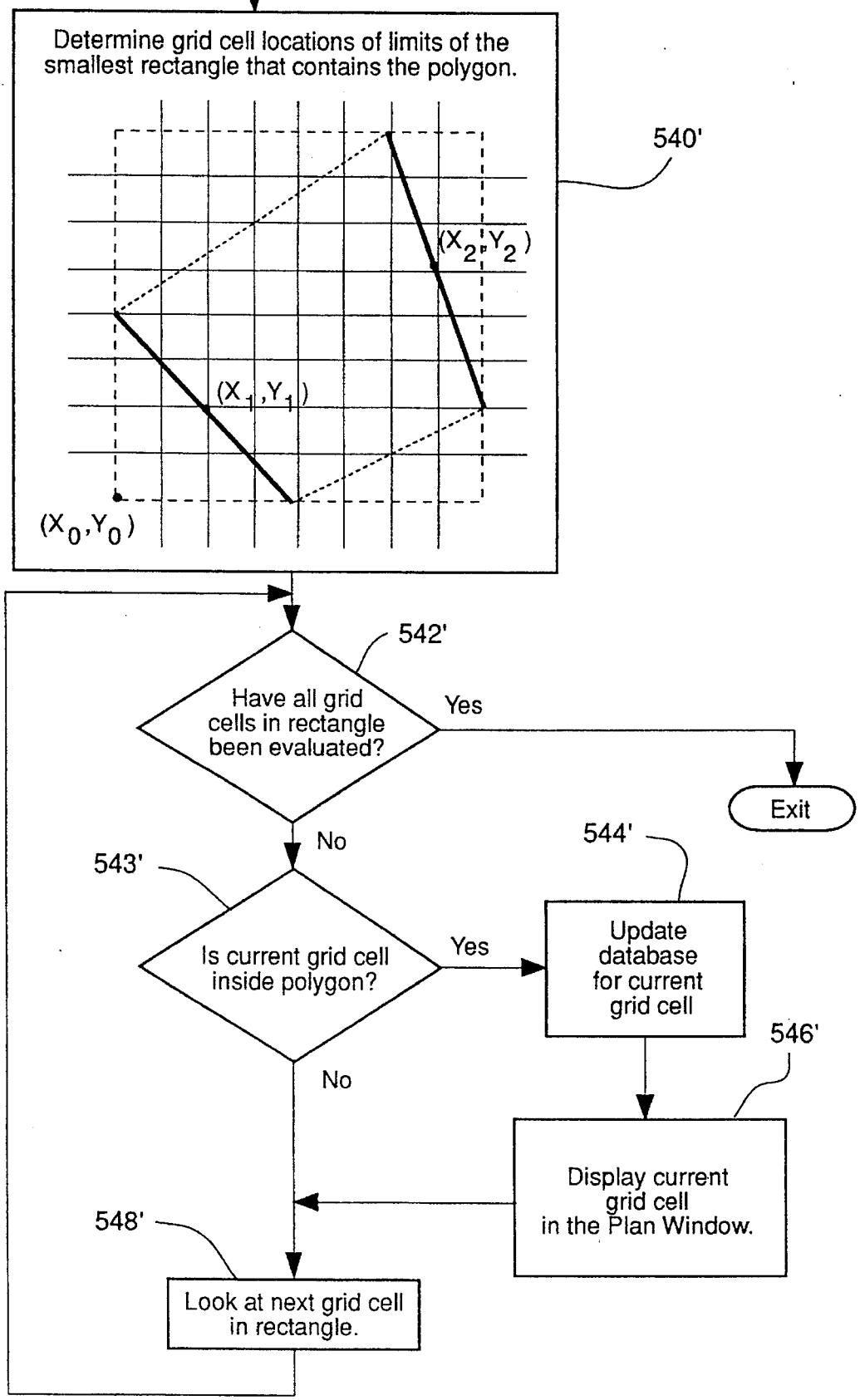

This is accomplished by replacing step 530 in FIG. 7B with step 530' from FIG. 7H, and the subroutine of FIG. 7D with the subroutine of FIG. 7I. Referring to step 530' in FIG. 7H, the system designates "effective" wheel or roller ends inboard from the actual ends. In the illustrated embodiment the effective ends are recognized by the differencing algorithm as inboard from the actual end a distance approximately one half the width of a grid element. For example, if the actual wheel width is 5.0 feet, corresponding to five 1.0 foot×1.0 foot grid elements, the effective locations of the wheel ends can be calculated, for example, one half foot inboard from each actual end. If the effective (non-actual) wheel ends of the compactor pass over any portion of a grid element on the digitized site model, that grid element is read and manipulated by the differencing algorithm as having been compacted, since in actuality at least one half of that grid element was actually passed over by the wheel. Of course, the amount of wheel end offset can vary depending on the size of the grid elements and the desired margin of error in determining whether the wheel has passed over a grid element.

While the algorithm of step 530' in FIG. 7H compensates for the lack of complete correspondence between the width of the compacting wheel or roller and the number of grid elements completely traversed by the wheel or roller, the distance and direction changes which the wheel makes between GPS position readings results in a loss of real time update information over a portion of the compactor's travel. This is particularly acute where compactor travel speed is high relative to the grid elements of the site plan. For example, where the grid elements are one meter square and the sampling rate of the position system is one coordinate sample per second, a machine traveling at 18 km per hour travels approximately five meters or five grid squares between position samplings. Accordingly, there is no real time information with respect to at least the intermediate three of the five grid squares covered by the machine. To solve this problem a "fill in the polygon" algorithm as shown in FIG. 7I is used to estimate the path traversed by the machine between coordinate samplings. In FIG. 7I the algorithm at step 540' locates a rectangle on the site plan grid surface defined by the effective ends of the compactor wheel at positions $(x_1, y_1)$ and $(x_2, y_2)$ and coordinate position $(x_0, Y_0)$. At steps 542', 543' and 548' a search algorithm searches within the rectangle's borders for those grid elements within a polygon defined between the two wheel positions; i.e., those grid elements traversed by the wheel between its effective ends.

At steps 544' and 546' the database and display are updated as described at steps 544 and 546, respectively, in FIGS. 7D–7F.

While the illustrated embodiment of a compacting application of the present invention is a pass-count based system, it will be apparent that other update protocols can be employed. For example, the change in amount of compaction per pass over a grid element can be determined by checking the elevation change since the last pass, and when the change in elevation on a particular pass is below a certain value (indicating that the garbage is near the desired compaction density), that grid element is updated on the screen as completed. Another method is to use an absolute compaction standard, registering a particular grid element as finished when the material thereon has been compacted from an uncompacted or initial elevation to a predetermined lower elevation.

Figure 8:
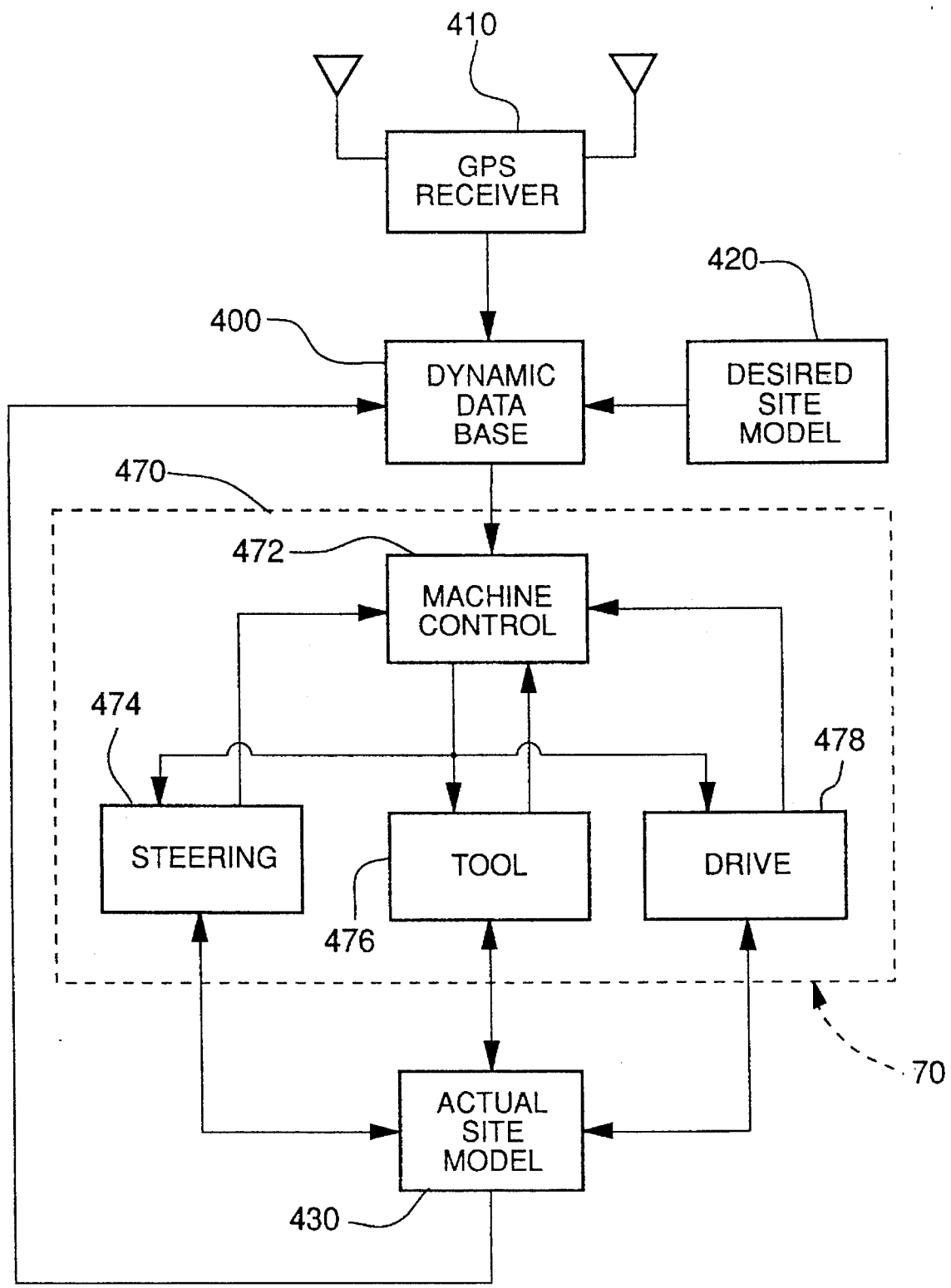
FIG. 8 is a schematic representation of the system of the present invention including a closed-loop automatic machine control system.

Referring now to FIG. 8, an alternate system according to the present invention is schematically shown for closed-loop automatic control of one or more operating systems on the compactor. While the embodiment of FIG. 8 is capable of use with or without a supplemental operator display as described above, for purposes of this illustration only automatic machine controls are shown. A suitable digital processing facility, for example a computer as described in the foregoing embodiments, containing the algorithms of the dynamic database of the invention is shown at 400. The dynamic database 400 receives 3-D instantaneous position information from GPS receiver system 410. The desired site model 420 is loaded or stored in the database of computer 400 in any suitable manner, for example on a suitable disk memory. Automatic machine control module 470 contains electrohydraulic machine controls 472 connected to operate, for example, steering and drive systems 474,476,478 on the compacting machine. Automatic machine controls 472 are capable of receiving signals from the dynamic database in computer 400 representing the difference between the actual site model 430 and the desired site model 420 to operate the steering and drive systems of the compactor to traverse the site in a manner to bring the actual site model into conformity with the desired site model. As the automatic machine controls 472 operate the steering and drive systems of the machine, the compaction of the site and the current position and direction of the compactor are received, read and manipulated by the dynamic database at 400 to update the actual site model. The actual site update information is received by database 400, which correspondingly updates the signals delivered to machine controls 472 for operation of the steering and drive systems of the compactor as it makes compacting passes over the site to bring the actual site model into conformity with the desired site model.

It will be apparent to those skilled in the art that the inventive method and system can be easily applied to monitor and control almost any compacting operation in which a machine travels over a work site to compact the site topography in real-time. The illustrated embodiments are provided to further an understanding of the broad principles of the invention, and to disclose in detail a preferred application. Many other modifications or applications of the invention can be made and still lie within the scope of the appended claims.

We claim:

1. Apparatus for directing the operations of a mobile site compacting machine comprising:

(a) digital data storage and retrieval means for storing a first site model representing the desired degree of compaction of a site and a second site model representing the actual degree of compaction of the site;

(b) means for generating digital signals representing in real time the instantaneous position in three-dimensional space of at least a portion of the compacting machine as it traverses the site;

(c) means for receiving said position signals and for updating the second model in accordance therewith;

(d) means for determining the difference between the first and second models in real time; and (e) means for directing the operation of the compacting machine in accordance with the difference to bring the updated second model into conformity with the first model.

2. Apparatus as defined in claim 1, wherein the means for generating three-dimensional position signals include a GPS receiver.

3. Apparatus as defined in claim 1, wherein the means for generating three-dimensional position signals is carried on the machine.

4. Apparatus as defined in claim 1, wherein the means for directing the operation of the machine include an operator display.

5. Apparatus as defined in claim 4, wherein the operator display includes a plan view of the site models and the difference therebetween.

6. Apparatus as defined in claim 4, wherein the operator display includes a real-time display of the position of the compacting machine relative to the site models.

7. Apparatus as defined in claim 4, wherein the operator display is carried on the mobile machine.

8. Apparatus as defined in claim 4, wherein the operator display is located off the mobile machine.

9. Apparatus as defined in claim 1, wherein the means for receiving the position signals and updating the second model, and the means for determining the difference between the first and second models are located on the machine.

10. Apparatus as defined in claim 1, wherein the means for receiving the position signals and updating the second model, and the means for determining the difference between the first and second models are located off the machine.

11. Apparatus as defined in claim 1, wherein the means for directing the operation of the machine include closed-loop automatic control means connected to actuate one or more operating systems on the machine.

12. Apparatus as defined in claim 1, further including differencing means for determining in real time a path of the machine relative to the site between position readings.

13. Apparatus as defined in claim 12, wherein the differencing means includes means for determining an effective width of a compacting portion of the machine which is of a magnitude less than or equal to the actual width of the compacting portion.

14. Apparatus as defined in claim 13, wherein the differencing means includes means for determining the area of the site traversed by the compacting portion of the machine between position readings, and means for updating the second site model according to the area traversed by the effective width of the compacting portion.

15. Apparatus as defined in claim 1, wherein the first site model comprises a predetermined desired degree of compaction of the site relative to an uncompacted state, and the difference between the first and second site models comprises the difference between the actual degree of compaction of the site and the desired degree of compaction of the site.

16. Apparatus as defined in claim 15, wherein the difference between the first and second site models is incremented between an uncompacted state of the site and the desired degree of compaction, the means for determining the difference between the first and second site models including means for detecting the addition of uncompacted material to the site and decrementing the difference between the first and second site models to the uncompacted state where the uncompacted material is detected.

17. Apparatus as defined in claim 15, wherein the desired degree of compaction is a function of one or more compacting passes by the machine over the site, and the means for determining the difference between the first and second site models include means for determining a number of compacting passes by the machine over the site.

18. Apparatus as defined in claim 15, wherein the desired degree of compaction is a function of a change in the elevation of the site, and the means for determining the difference between the first and second site models include means for determining a change in the elevation of the site.

19. Apparatus as defined in claim 1, wherein the machine comprises a landfill compactor.

20. Apparatus as defined in claim 1, wherein the machine comprises an asphalt paving machine.

21. Apparatus as defined in claim 1, wherein the machine comprises an earth compacting machine.

22. A method of directing the operation of a mobile site compacting machine comprising the steps of:
  (a) producing and storing in a digital data storage and retrieval means both a first site model representing the desired degree of compaction of the site and a second site model representing the actual degree of compaction of the site;
  (b) generating signals representing in real time the instantaneous position in three-dimensional space of at least a portion of the compacting machine as it traverses the site;
  (c) updating the second model in accordance with said three-dimensional position signals;
  (d) determining the difference between the first and second site models; and
  (e) directing the operation of the compacting machine in accordance with the difference to bring the updated second site model into conformity with the first site model.

23. A method as defined in claim 22, wherein the three-dimensional position signals are generated by a GPS receiver.

24. A method as defined in claim 22, wherein the three-dimensional position signals are generated by means carried on the machine.

25. A method as defined in claim 24, wherein the step of directing the operation of the machine in accordance with the difference between the first and second site models includes providing an operator display of the difference between the first and second site models.

26. A method as defined in claim 25, further including the step of displaying the difference between the first and second site models in a plan view.

27. A method as defined in claim 25, further including the step of displaying a real time position of the machine relative to the first and second site models.

28. A method as defined in claim 25, further including the step of providing the operator display on the machine.

29. A method as defined in claim 25, further including the step of providing the operator display off the machine.

30. A method as defined in claim 22, wherein the steps of updating the second model and determining the difference between the first and second models are carried out by means on the machine.

31. A method as defined in claim 22, wherein the steps of updating the second model and determining the difference between the first and second models are carried out by means off the machine.

32. A method as defined in claim 22, wherein the step of directing the operation of the machine in accordance with the difference between the first and second site models includes the step of delivering a signal to automatic control means on the machine for controlling operation of a machine system to bring the second site model into conformity with the first site model.

33. A method as defined in claim 22, wherein the first site model comprises a predetermined desired degree of compaction of the site relative to an uncompacted state, and the difference between the first and second site models is determined as the difference between the actual degree of compaction of the site and the desired degree of compaction of the site.

34. A method as defined in claim 33, wherein the difference between the first and second site models is incremented between an uncompacted state of the site and the desired degree of compaction, and the step of determining the difference between the first and second site models includes the step of determining the addition of uncompacted material to the site and decrementing the difference between the first and second site models to the uncompacted state where the uncompacted material is detected.

35. A method as defined in claim 33, wherein the desired degree of compaction is determined as a function of a number of compacting passes by the machine over the site.

36. A method as defined in claim 33, wherein the desired degree of compaction is determined as a function of a change in the elevation of the site.

37. A method as defined in claim 22, wherein the step of updating the second model in accordance with the position of the machine includes the step of determining in real time a path of the machine relative to the site between the position readings.

38. A method as defined in claim 37, wherein the compacting machine includes two spaced compacting wheels with site-contacting footprints, and the step of determining in real time the path of the machine includes the step of determining in real time the path of the spaced footprints between position readings.

39. A method as defined in claim 38, wherein the step of determining the real time path of the footprints between position readings includes the step of tracking a line path of the centers of the footprints between position readings.

40. A method as defined in claim 37, further including the step of determining an effective width for a compacting portion of the machine which is of a magnitude less than or equal to the actual width of the compacting portion.

41. A method as defined in claim 40, further including the step of determining the area of the site traversed by the compacting portion of the machine between position readings, and updating the second site model according to the area of the site traversed by the effective width of the compacting portion.

42. A method as defined in claim 22, including the step of directing the operation of the machine for landfill compacting.

43. A method as defined in claim 22, including the step of directing the operation of the machine for earth compacting.

44. A system for accurately monitoring and controlling the compaction of a work site and compaction machinery operating on the work site, comprising:
  a mobile compacting machine for compacting the site, the machine equipped with positioning means to accurately determine in real time the instantaneous position of at least a portion of the machine in three dimensions as the machine traverses the site;

a digital data storage facility in communication with the positioning means;

a first model of a desired degree of site compaction, and a second model of the actual degree of site compaction, the first and second site models stored in the digital data storage facility;

dynamic database means communicating with the digital data storage facility and the positioning means, the dynamic database means monitoring the position of the machine relative to the site in real time and updating the second site model in real time in response to the monitored position of the machine as it traverses the site, the dynamic database means further generating signals representing the difference in the degree of compaction between the first and second site models for directing the operation of the machine to bring the second updated site model into conformity with the first site model.

45. A system as defined in claim 44, further including operator display means for communicating said signals with the dynamic database means, and displaying the difference between the first and second site models and the position of the machine relative to the site.

46. A system as defined in claim 45, wherein the operator display is located on the machine.

47. A system as defined in claim 45, wherein the operator display is located off the machine.

48. A system as defined in claim 44, wherein the dynamic database means is located on the machine.

49. A system as defined in claim 44, wherein the dynamic database means is located off the machine.

50. A system as defined in claim 44, further including automatic control means on the machine in communication with the dynamic database means, the signals representing the difference between the first and second site models operating the automatic control means to bring the second site model into conformity with the first site model.

51. A system as defined in claim 44, wherein the positioning means comprise a GPS receiver.

52. A system as defined in claim 44, wherein the positioning means are mounted on the machine at a known position relative to a portion of the machine in contact with the site surface.

53. A system as defined in claim 44, wherein the machine is provided with positioning means located at first and second spaced locations on the machine, said positioning means at the second location providing a directional reference relative to the positioning means at the first location.

54. A system as defined in claim 44, wherein the dynamic database includes differencing means for determining in real time a path of the machine relative to the site between position readings.

55. A system as defined in claim 54, wherein the machine includes two spaced compacting wheels with site-contacting footprints at a known, fixed position relative to the positioning means, the differencing means determining in real time the path of the footprints relative to the site between position readings.

56. A system as defined in claim 55, wherein the differencing means includes a Bresenham's algorithm for determining a line path of the centers of the compacting wheel footprints of the compacting machine between position readings.

57. A system as defined in claim 52, wherein the machine includes a compacting portion of continuous width, and the dynamic database means includes means for determining an effective width for the compacting portion which is of a magnitude less than or equal to the actual width of the compacting portion.

58. A system as defined in claim 57, wherein the differencing means includes a fill-in-the-polygon algorithm for determining the path traversed by the effective width of the compacting portion of the machine between position readings.

59. A system as defined in claim 58, wherein the dynamic database means further includes means for updating the second site model according to the area of the site traversed by a compacting portion of the machine.

60. A method for determining in real time a path of a mobile compacting machine over a work site, comprising the steps of:

providing a model of the site subdivided into a continuous matrix of unit areas;

equipping the mobile machine with means for determining a position in three-dimensional space of at least a portion of the machine as it traverses the site;

tracking the position of the machine while it traverses the site as a series of coordinate points on the site model;

determining the width of a compacting portion of the machine relative to the unit areas of the site model; and, where the rate at which the coordinate points are tracked is not synchronous with the rate of travel of the machine over the unit areas of the site, determining a path for the machine in real time comprising the unit areas traversed by the compacting portion of the machine between coordinate points.

61. A method as defined in claim 60, wherein the compacting machine includes two spaced compacting wheels with site-contacting footprints, and the step of determining in real time the path of the machine includes the step of determining in real time the path of the spaced footprints between position readings.

62. A method as defined in claim 61, wherein the step of determining the real time path of the footprints between position readings includes the step of tracking a line path of the centers of the footprints between position readings.

63. A method as defined in claim 60, wherein the width of the compacting portion of the machine is determined as an effective width which is less than or equal to the actual width of the compacting portion, and the path of the machine over the site as represented on the site model is determined by the path of the effective width of the compacting portion.

64. A method as defined in claim 63, wherein the effective width is determined by locating each effective end of the compacting portion of the machine from each actual end a distance corresponding to a fraction of the width of one unit area on the site model.

65. A method as defined in claim 63, wherein the compacting portion of the machine comprises a plurality of compacting portions.

66. A method as defined in claim 60, further including the step of updating the degree of compaction of each unit area of the site model over which the compacting portion is determined to have passed.

67. A method for precisely determining the position of a compacting machine in three-dimensional space relative to a land site using three-dimensional position signals and a digitized model of the site, the method comprising the steps of:

(a) equipping the compacting machine with positioning means for receiving the position signals;

(b) producing and storing a site model representing the degree of compaction of the site in a digital data storage facility;

(c) operating the compacting machine on the site while simultaneously updating the site model in the storage facility in real time according to the three-dimensional position of at least a portion of the machine relative to the site.

68. A method as defined in claim 67, wherein the site model is an actual site model representing the actual degree of compaction of the site.

69. A method as defined in claim 68, further including the step of producing and storing a desired site model representing a desired degree of compaction of the site in the digital data storage facility, and determining in real time the difference between the actual site model and the desired site model as the actual site model is updated.

70. A method as defined in claim 69, wherein the machine includes two spaced compacting wheels with site-contacting footprints at a known, fixed position relative to the positioning means, and further including the step of determining in real time a path of the footprints relative to the site between position readings.

71. A system as defined in claim 70, further including the step of determining a line path of the centers of the compacting wheel footprints of the compacting machine between position readings.

72. A method as defined in claim 69, wherein the desired degree of compaction of the site is a function of the elevation of the site surface.

73. A method as defined in claim 69, wherein the desired degree of compaction of the site is a function of a number of passes by the compacting machine over the site.

74. A method as defined in claim 69, wherein the desired site model comprises a predetermined desired range of compaction of the site relative to an uncompacted state, and the difference between the actual and desired site models comprises the difference between the actual degree of compaction of the site and the desired degree of compaction of the site.

75. A method as defined in claim 74, wherein the difference between the actual and desired site models is incremented between an uncompacted state of the site and the desired degree of compaction, and the step of determining the difference between the actual and desired site models includes the step of determining the addition of uncompacted material to the site and decrementing the difference between the actual and desire site models to the uncompacted state where the uncompacted material is detected.

76. A method as defined in claim 67, wherein the method further includes the step of displaying and updating the site model to an operator of the machine in real time.

77. An apparatus for precisely determining the position of a compacting machine in three-dimensional space relative to a land site using three-dimensional position signals and a digitized site model, comprising:

(a) a mobile machine equipped with means for receiving the position signals and for determining the instantaneous position in three-dimensional space of at least a compacting portion of the machine as the machine traverses the site;

(b) a site model of the degree of compaction of the site stored in a digital data storage facility;

(c) dynamic database means communicating with the means for determining the machine position and the digital data storage facility, the dynamic database means including means for updating the site model in the storage facility in real time according to the three-dimensional position of at least the compacting portion of the machine relative to the site.

78. Apparatus as defined in claim 77, wherein the site model is an actual site model representing an actual degree of compaction of the site.

79. Apparatus as defined in claim 77, wherein a desired site model of a desired degree of compaction of the site is stored in the digital data storage facility, and the dynamic database means include differencing means for determining in real time the difference between the actual site model and the desired site model as the actual site model is updated.

80. Apparatus as defined in claim 79, wherein the desired site model comprises a predetermined desired degree of compaction of the site relative to an uncompacted state, and the difference between the actual and desired site models comprises the difference between the actual degree of compaction of the site and the desired degree of compaction of the site.

81. Apparatus as defined in claim 80, wherein the difference between the actual and desired site models is incremented between an uncompacted state and the desired degree of compaction, and the step of determining the difference between the actual and desired site models includes the step of determining the addition of uncompacted material to the site and decrementing the difference between the actual and desired site models to the uncompacted state where the uncompacted material is detected.

82. Apparatus as defined in claim 77, wherein the apparatus includes means for displaying the updated site model to an operator of the machine in real time.

83. Apparatus as defined in claim 82, wherein the operator display means are located on the machine.

84. Apparatus as defined in claim 82, wherein the operator display means are located off the machine.

85. Apparatus as defined in claim 77, wherein the dynamic database means are located on the machine.

86. Apparatus as defined in claim 83, wherein the dynamic database means are located off the machine and the apparatus further includes means for transmitting signals representing the updated site model from the dynamic database means off the machine to the operator display means on the machine, and means for transmitting the machine position to the dynamic database means.

* * * * *

UNITED STATES PATENT AND TRADEMARK OFFICE
CERTIFICATE OF CORRECTION

PATENT NO. : 5,471,391

DATED : November 28, 1995

INVENTOR(S) : Gudat et al

It is certified that error appears in the above-identified patent and that said Letters Patent is hereby corrected as shown below:

In claim 1, column 18, line 4, after "determining" insert --and updating--.

In claim 22, column 19, line 36, after "determining" insert --and updating--.

In claim 44, column 21, line 18, before "difference" insert --updated real time--.

Column 21, lines 63-67:
In claim 56, delete "A system as defined in claim 55, wherein the differencing means includes a Bresenham's algorithm for determining a line path of the centers of the compacting wheel footprints of the compacting machine between position readings" and insert --A system as defined in claim 54, wherein the machine includes a compacting portion of continuous width, and the dynamic database means includes means for determining an effective width for the compacting portion which is of a magnitude less than or equal to the actual width of the compacting portion--.

Column 22, lines 1-6:
In claim 57, delete "A system as defined in claim 52, wherein the machine includes a compacting portion of continuous width, and the dynamic database means includes means for determining an effective width for the compacting portion which is of a magnitude less than or equal to the actual width of the compacting portion" and insert --A system as defined in claim 56, wherein the differencing means includes a Bresenham's algorithm for determining a line path of the center of the compacting portion between position readings--.

In claim 58, column 22, line 7, delete "57" and insert --56--.

In claim 59, column 22, line 12, delete "58" and insert --54--

UNITED STATES PATENT AND TRADEMARK OFFICE
CERTIFICATE OF CORRECTION

PATENT NO. : 5,471,391

DATED : November 28, 1995

INVENTOR(S) : Gudat et al

It is certified that error appears in the above-identified patent and that said Letters Patent is hereby corrected as shown below:

In claim 60, column 22, line 27, delete "relative to" and insert --as a function of--;

column 22, lines 28-30, delete "where the rate at which the coordinate points are tracked is not synchronous with the rate of travel of the machine over the unit areas of the site,"

column 22, line 31, delete "for" and insert --of-- and after "machine" insert --relative to the site--;

column 22, line 32, after "areas" insert --of the site model--.

In claim 62, column 22, line 40, delete "61" and insert --60--;

column 22, line 41, delete "footprints" and insert --compacting portion--;

column 22, line 43, delete "centers" and insert --center--;

column 22, line 43, delete "footprints" and insert --compacting portion--.

In claim 67, column 22, line 65, before "site" insert --and for directing the progress of work performed on the site by the machine,--;

column 23, line 2, delete "a" and insert --an actual--;

column 23, line 3, before "degree" insert --actual-- and after "site" insert --, and a desired site model comprising a static three-dimensional model of a desired degree of compaction of the site--;

column 23, line 9, after "site" insert --and determining and updating in real time the difference between the actual site model and the desired site model as the actual site model is updated--.

UNITED STATES PATENT AND TRADEMARK OFFICE
CERTIFICATE OF CORRECTION

PATENT NO. : 5,471,391

DATED : November 28, 1995

INVENTOR(S) : Gudat et al

It is certified that error appears in the above-identified patent and that said Letters Patent is hereby corrected as shown below:

Cancel claims 68 and 69.

In claim 70, column 23, line 19, delete "69" and insert --67--;
          column 23, line 20, delete "two spaced compacting wheels" and insert --a compacting portion of continuous width-- and after "with" insert --a--;
          column 23, line 21, delete "footprints" and insert --footprint--
          column 23, line 23, delete "footprints" and insert --footprint--

In claim 71, column 23, line 26, delete "centers" and insert --center--;
          column 23, line 27, delete "wheel footprints" and insert --portion--.

In claim 72, column 23, line 29, delete "69" and insert --67--.

In claim 73, column 23, line 32, delete "69" and insert --67--.

In claim 74, column 23, line 35, delete "69" and insert --67--;
          column 23, line 36, delete "range" and insert --degree--.

In claim 77, column 23, line 57, after "model," insert --and for directing the progress of work performed on the site by the machine--
          column 24, line 14, after "site" insert --, wherein the site model is an actual site model representing the actual degree of compaction of the site, and a desired site model representing a desired degree of compaction of the site is stored in the digital data storage facility, the dynamic database means including differencing means for determining and updating in real time the difference between the actual site model and the desired site model as the actual site model is updated--.
Column 24, line 15-23:
Cancel claims 78 and 79.

UNITED STATES PATENT AND TRADEMARK OFFICE
CERTIFICATE OF CORRECTION

PATENT NO. : 5,471,391

DATED : November 28, 1995

INVENTOR(S) : Gudat et al

It is certified that error appears in the above-identified patent and that said Letters Patent is hereby corrected as shown below:

In claim 80, column 24, line 24, delete "79" and insert --77--.

Signed and Sealed this

Twenty-third Day of April, 1996

Attest:

BRUCE LEHMAN

Attesting Officer

Commissioner of Patents and Trademarks